United States Patent
Kumaki et al.

[11] Patent Number: 6,141,451
[45] Date of Patent: *Oct. 31, 2000

[54] IMAGE CODING METHOD AND APPARATUS

[75] Inventors: Satoshi Kumaki; Tetsuya Matsumura; Hiroshi Segawa; Kazuya Ishihara; Yoshinori Matsuura; Atsuo Hanami, all of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/982,427

[22] Filed: Dec. 2, 1997

[30] Foreign Application Priority Data

Jun. 17, 1997 [JP] Japan .................... 9-159634

[51] Int. Cl.$^7$ ..................... G06K 9/36
[52] U.S. Cl. ............. 382/238; 348/402; 348/416; 348/431
[58] Field of Search .............. 382/236, 238, 382/232; 348/400–402, 409–418, 422, 430, 431

[56] References Cited

U.S. PATENT DOCUMENTS

| | | | |
|---|---|---|---|
| 5,157,742 | 10/1992 | Nihara | 382/236 |
| 5,400,087 | 3/1995 | Uramoto et al. | 348/699 |
| 5,497,338 | 3/1996 | Miyake et al. | 382/232 |
| 5,832,124 | 11/1998 | Sato et al. | 382/238 |
| 5,912,706 | 6/1999 | Kikuchi et al. | 348/401 |

FOREIGN PATENT DOCUMENTS

| | | |
|---|---|---|
| 63-169878 | 7/1988 | Japan . |
| 7-162869 | 6/1995 | Japan . |
| 8-46968 | 2/1996 | Japan . |

OTHER PUBLICATIONS

MPEG Technique, pp. 32–34, chapter 3 and p. 61, chapter 8–3–1, Triceps Company Co., Ltd.

Technical Bulletin of Mitsubishi Denki Kabushiki Kaisha, vol. 70, No. 3, 1996, "Programmable Real Time MPEG2: Video Encoder Chip Set".

*Primary Examiner*—Bhavesh Mehta
*Assistant Examiner*—Gregory Desiré
*Attorney, Agent, or Firm*—Burns, Doane, Swecker & Mathis, LLP

[57] ABSTRACT

Disclosed is an image coding method and apparatus for preventing a coding quantity of coding data from being increased when a redundancy between image planes is low. A selector outputs either an optimum motion vector output from a motion vector detecting device or a motion vector output from a motion vector storing section to a real time image coding device for performing coding on the basis of an evaluation value output from the motion vector detecting device. If it is decided, according to the evaluation value, that a redundancy between a reference image plane and a coding object image plane is low, the motion vector is selected so that the coding quantity of the coding data can be prevented from being increased.

14 Claims, 23 Drawing Sheets

IMAGE CODING METHOD AND APPARATUS

BACKGROUND OF THE INVENTION

1. Field of the Invention

The present invention relates to an image coding method and apparatus for compressing and coding a moving picture.

2. Description of the Background Art

As a moving picture compressing and coding method, MPEG1 and MPEG2 methods and the like have been known in the prior art. These methods have used a predictive coding method which utilizes a motion vector to reduce a redundancy between a frame and a field (hereinafter referred to as an "image plane") and a transform coding method which utilizes orthogonal transform (discrete cosine transform) to reduce the redundancy in the image plane. In these methods, furthermore, an input image signal is divided into blocks having a predetermined size (hereinafter referred to as a "coding block") for which a coding processing is performed, respectively.

FIG. 25 is a block diagram showing an image coding apparatus having a function of the MPEG2 according to the prior art. In FIG. 25, the reference numeral 101 denotes a function block for detecting a motion vector, the reference numeral 102 denotes a function block (prediction mode discriminator) for controlling predictive coding, the reference numeral 103 denotes a function block for performing coding according to control of the function block 102 on receipt of a video input filtered by a function block 115 (a coding object image plane) and a prediction image (reference image plane) generated by a function block 112, the reference numeral 104 denotes a function block for performing discrete cosine transform while carrying out blocking by a function block 116, the reference numeral 106 denotes a function block for performing quantization, the reference numeral 109 denotes a function block for transforming an output of the function block 106 into a bit stream, the reference numeral 107 denotes a function block for performing inverse quantization, the reference numeral 109 denotes a function block for performing inverse discrete cosine transform, the reference numeral 110 denotes a function block for reconfiguring an image in response to an output of the function block 108 and that of the function block 112 for generating a prediction image, the reference numeral 105 denotes a function block for storing an output of the function block 110 which is limited by a function block 111, the reference numeral 113 denotes a function block for detecting that a scene of the image plane is changed or not, i.e., a scene change, and the reference numeral 114 denotes a function block for controlling the function block 106.

The function block 102 has function blocks 2a to 2c. The function block 2a controls to perform coding using two motion vectors or one motion vector. The function block 2b controls to perform motion compensation (MC) or not. The function block 2c controls to perform intraframe prediction (INTRA) or interframe prediction (INTER).

FIG. 26 is a diagram for explaining the predictive coding method. In the predictive coding method, a rectangle which is the most similar to a coding block 921 in a coding object image plane 920 at a time t2 is retrieved from a predetermined area 900 of a reference image plane 910 at a time t1. Next, a difference between a retrieved rectangle 911 and the coding block 921 is generated. Coding is performed for the difference. Information about the rectangle 911 which has been used is added as header information when the coding is performed. The header information indicates a displacement of the coding block, that is, a motion vector MV.

Coding data obtained by performing the predictive coding includes the header information and data about pixels of the coding block (difference pixel coding data).

Predictive coding operation has an effect that a redundancy between the reference image plane 910 and the coding object image plane 920 is reduced. However, when a correlation between the reference image plane 910 and the coding object image plane 920 is low, the redundancy between the reference image plane 910 and the coding object image plane 920 is low. Accordingly, if the predictive coding is performed for the coding block before coding when the redundancy between the reference image plane 910 and the coding object image plane 920 is low, the obtained effects are reduced because the redundancy is originally low. More specifically, when the redundancy between the reference image plane 910 and the coding object image plane 920 is low, a coding quantity of the coding data has no great difference in the cases where the coding is exactly performed for the coding block 921 and where the predictive coding is performed for the coding block 921 before the coding. The reason is that the coding quantity is increased corresponding to an addition of the header information.

In the prior art, thus, there has been a problem that the coding quantity of the coding data is increased if the predictive coding is performed for the coding block before the coding when the redundancy between the reference image plane 910 and the coding object image plane 920 is low.

SUMMARY OF THE INVENTION

A first aspect of the present invention is directed to an image coding method for performing predictive coding for a first image in a coding object image plane by using motion information about a motion of the first image from a certain position in a reference image plane, comprising a first step of detecting first displacement information including a first displacement quantity from a second image in the reference image plane corresponding to the first image in the coding object image plane to the first image, a second step of selecting either the first displacement information or predetermined second displacement information, and a third step of performing the predictive coding by using, as the motion information, the first or second displacement information selected at the second step.

A second aspect of the present invention is directed to the image coding method, wherein the second displacement information includes a predetermined second displacement quantity.

A third aspect of the present invention is directed to the image coding method, wherein the first step includes a step of detecting an evaluation value indicative of a degree of similarity of each image in the reference image plane to the first image and retrieving the second image in response to the evaluation value, and the second step includes a fourth step of comparing the evaluation value with a predetermined threshold, and a fifth step of performing the selection in response to a result of the comparison.

A fourth aspect of the present invention is directed to the image coding method, further comprising a step of detecting a correlation between the reference image plane and the coding object image plane, the second step performing the selection in response to the correlation.

A fifth aspect of the present invention is directed to the image coding method, wherein the coding object image plane has a plurality of blocks, the blocks having the first image, respectively, the image coding method further comprising a step of repeatedly executing the first and second steps for the blocks, wherein the second displacement information is the first displacement information detected at the first step executed last time, and the third step generates a difference between the last motion information and current motion information and performs the coding by using the difference.

A sixth aspect of the present invention is directed to the image coding method, wherein the coding object image plane has a plurality of blocks, the blocks having the first image, respectively, the image coding method further comprising a step of repeatedly executing the first and second steps for the blocks, wherein the result of the comparison used at the fifth step corresponds to a specific one of the blocks which is positioned on a periphery in the coding object image plane.

A seventh aspect of the present invention is directed to the image coding method, wherein the coding object image plane has a plurality of blocks, the blocks having the first image, respectively, the image coding method further comprising a step of repeatedly executing the first and second steps for the blocks, and a step of generating a sum of the evaluation values corresponding to the blocks, wherein the evaluation value at the fourth step is the sum.

An eighth aspect of the present invention is directed to the image coding method, further comprising a step of detecting a correlation between the reference image plane and the coding object image plane, wherein the fifth step performs the selection by giving the correlation priority over the result of the comparison.

A ninth aspect of the present invention is directed to the image coding method, wherein the first displacement information includes one or more first displacement quantities, and first mode information indicative of the number of the first displacement quantities, and the second displacement information includes a second displacement quantity, and second mode information indicative of the number of the second displacement quantity.

A tenth aspect of the present invention is directed to an image coding apparatus for performing predictive coding for a first image in a coding object image plane by using motion information about a motion of the first image from a certain position in a reference image plane, comprising motion information detecting means for detecting first displacement information including a first displacement quantity from a second image in the reference image plane corresponding to the first image in the coding object image plane to the first image, displacement information storing means for storing predetermined second displacement information, selecting means for selecting either the first displacement information or the second displacement information, and predictive coding means for performing the predictive coding by using, as the motion information, the first or second displacement information selected by the selecting means.

An eleventh aspect of the present invention is directed to the image coding apparatus, wherein the second displacement information includes a predetermined second displacement quantity.

A twelfth aspect of the present invention is directed to the image coding apparatus, further comprising threshold storing means for storing a predetermined threshold, and comparing means for comparing an evaluation value with the threshold, wherein the motion information detecting means detects an evaluation value indicative of a degree of similarity of each image in the reference image plane to the first image, and retrieves the second image in response to the evaluation value, and the selecting means performs the selection in response to a result of the comparison.

A thirteenth aspect of the present invention is directed to the image coding apparatus, further comprising image plane correlation detecting means for detecting a correlation between the reference image plane and the coding object image plane, wherein the selecting means performs the selection in response to the correlation.

A fourteenth aspect of the present invention is directed to the image coding apparatus, wherein the coding object image plane has a plurality of blocks, the blocks have the first image, respectively, the motion information detecting means and the selecting means perform the detection and the selection for the blocks, respectively, the second displacement information stored in the displacement information storing means is the first displacement information detected by the motion information detecting means last time, and the predictive coding means generates a difference between the last motion information and current motion information, and performs the coding by using the difference.

A fifteenth aspect of the present invention is directed to the image coding apparatus, wherein the coding object image plane has a plurality of blocks, the blocks have the first image, respectively, and the motion information detecting means and the selecting means perform the detection and the selection for the blocks, respectively, the image coding apparatus further comprising specific result storing means for storing the result of the comparison corresponding to a specific one of the blocks which is positioned on a periphery in the coding object image plane, and outputting the result of the comparison to the selecting means.

A sixteenth aspect of the present invention is directed to the image coding apparatus, wherein the coding object image plane has a plurality of blocks, the blocks have the first image, respectively, and the motion information detecting means and the selecting means perform the detection and the selection for the blocks, respectively, the image coding apparatus further comprising summing means for generating a sum of the evaluation values corresponding to the blocks and outputting the summed evaluation values to the comparing means.

A seventeenth aspect of the present invention is directed to the image coding apparatus, further comprising image plane correlation detecting means for detecting a correlation between the reference image plane and the coding object image plane, wherein the selecting means performs the selection by giving the correlation priority over the result of the comparison.

An eighteenth aspect of the present invention is directed to the image coding apparatus, wherein the first displacement information includes one or more first displacement quantities, and first mode information indicative of the number of the first displacement quantities, and the second displacement information includes a second displacement quantity, and second mode information indicative of the number of the second displacement quantity.

A nineteenth aspect of the present invention is directed to the image coding method, wherein the first step includes a step of detecting an evaluation value indicative of a degree of similarity of each image in the reference image plane to the first image and retrieving the second image in response to the evaluation value, and the second step includes a fourth step of comparing the evaluation value with a predetermined threshold, and a fifth step of performing the selection in response to a result of the comparison.

A twentieth aspect of the present invention is directed to the image coding apparatus, further comprising threshold storing means for storing a predetermined threshold, and comparing means for comparing an evaluation value with the threshold, wherein the motion information detecting means detects an evaluation value indicative of a degree of similarity of each image in the reference image plane to the first image, and retrieves the second image in response to the evaluation value, and the selecting means performs the selection in response to a result of the comparison.

According to the first aspect of the present invention, when the first displacement information is selected at the second step, the predictive coding can normally be performed at the third step. On the other hand, when the second displacement information is selected at the second step, a coding quantity of coding data can be prevented from being increased if a redundancy between the reference image plane and the coding object image plane is low.

According to the second aspect of the present invention, the predetermined second displacement quantity is used. Consequently, a structure can be simplified.

According to the third aspect of the present invention, the evaluation value detected when the second image is retrieved is compared with the threshold. Consequently, the redundancy between the reference image plane and the coding object image plane can be judged.

According to the fourth aspect of the present invention, the correlation between the reference image plane and the coding object image plane is used. Consequently, the redundancy between the reference image plane and the coding object image plane can be taken into consideration.

According to the fifth aspect of the present invention, the coding is performed by using the difference between the last motion information and the current motion information, and the second displacement information is the first displacement information detected at the first step executed last time. Consequently, the difference used for the coding is set to zero. Thus, the coding quantity of the coding data can be prevented from being increased.

According to the sixth aspect of the present invention, the image is less changed on the periphery of the image plane than a center thereof. Therefore, the correlation between the coding object image plane and the reference image plane can be judged on the basis of the result of the comparison corresponding to the specific block positioned on the periphery in the coding object image plane. Accordingly, the redundancy between the reference image plane and the coding object image plane can be judged.

According to the seventh aspect of the present invention, the correlation between the coding object image plane and the reference image plane can be taken into consideration by comparison of the sum of the evaluation values with the threshold. Consequently, the redundancy between the reference image plane and the coding object image plane can be judged.

According to the eighth aspect of the present invention, priority is given to the correlation between the reference image plane and the coding object image plane such that the selection is performed. Consequently, the redundancy between the reference image plane and the coding object image plane can be judged with high precision.

According to the ninth aspect of the present invention, the second displacement information is caused to include the second mode information so that it can correspond to a mode of detection of the first displacement information. Furthermore, the number of the second displacement quantities included in the second displacement information is made singular so that the coding quantity of the coding data can be reduced more.

According to the tenth aspect of the present invention, when the selecting means selects the first displacement information, the predictive coding can normally be performed by the predictive coding means. On the other hand, when the selecting means selects the second displacement information, the coding quantity of the coding data can be prevented from being increased if the redundancy between the reference image plane and the coding object image plane is low.

According to the eleventh aspect of the present invention, the predetermined second displacement quantity is used. Consequently, a structure can be simplified.

According to the twelfth aspect of the present invention, the comparing means compares the evaluation value detected by the motion information detecting means with the threshold stored in the threshold storing means. Consequently, the redundancy between the reference image plane and the coding object image plane can be judged.

According to the thirteenth aspect of the present invention, the correlation detected by the image plane correlation detecting means is used. Consequently, the redundancy between the reference image plane and the coding object image plane can be taken into consideration.

According to the fourteenth aspect of the present invention, the predictive coding means generates the difference between the last motion information and the current motion information, and the second displacement information stored in the displacement information storing means is the first displacement information detected at the first step executed last time. Consequently, the difference used for the coding is set to zero. Thus, the coding quantity of the coding data can be prevented from being increased.

According to the fifteenth aspect of the present invention, the image is less changed on the periphery of the image plane than the center thereof. Therefore, the correlation between the coding object image plane and the reference image plane can be taken into consideration on the basis of the result of the comparison stored in the specific result storing means. Accordingly, the redundancy between the reference image plane and the coding object image plane can be judged.

According to the sixteenth aspect of the present invention, the correlation between the coding object image plane and the reference image plane can be judged by the comparison of the sum output from the summing means with the threshold. Consequently, the redundancy between the reference image plane and the coding object image plane can be judged.

According to the seventeenth aspect of the present invention, priority is given to the correlation detected by the image plane correlation detecting means such that the selection is performed. Consequently, the redundancy between the reference image plane and the coding object image plane can be judged with high precision.

According to the eighteenth aspect of the present invention, the second displacement information is caused to include the second mode information so that it can correspond to the mode of the detection of the first displacement information. Furthermore, the number of the second displacement quantities included in the second displacement information is made singular so that the coding quantity of the coding data can be reduced more.

According to the nineteenth aspect of the present invention, the evaluation value detected when the second image is retrieved is compared with the threshold. Consequently, the redundancy between the reference image plane and the coding object image plane can be judged.

According to the twentieth aspect of the present invention, the comparing means compares the evaluation value detected by the motion information detecting means with the threshold stored in the threshold storing means. Consequently, the redundancy between the reference image plane and the coding object image plane can be judged.

In order to solve these problems, it is an object of the present invention to provide an image coding method and apparatus for preventing a coding quantity of coding data from being increased when a redundancy between image planes is low.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
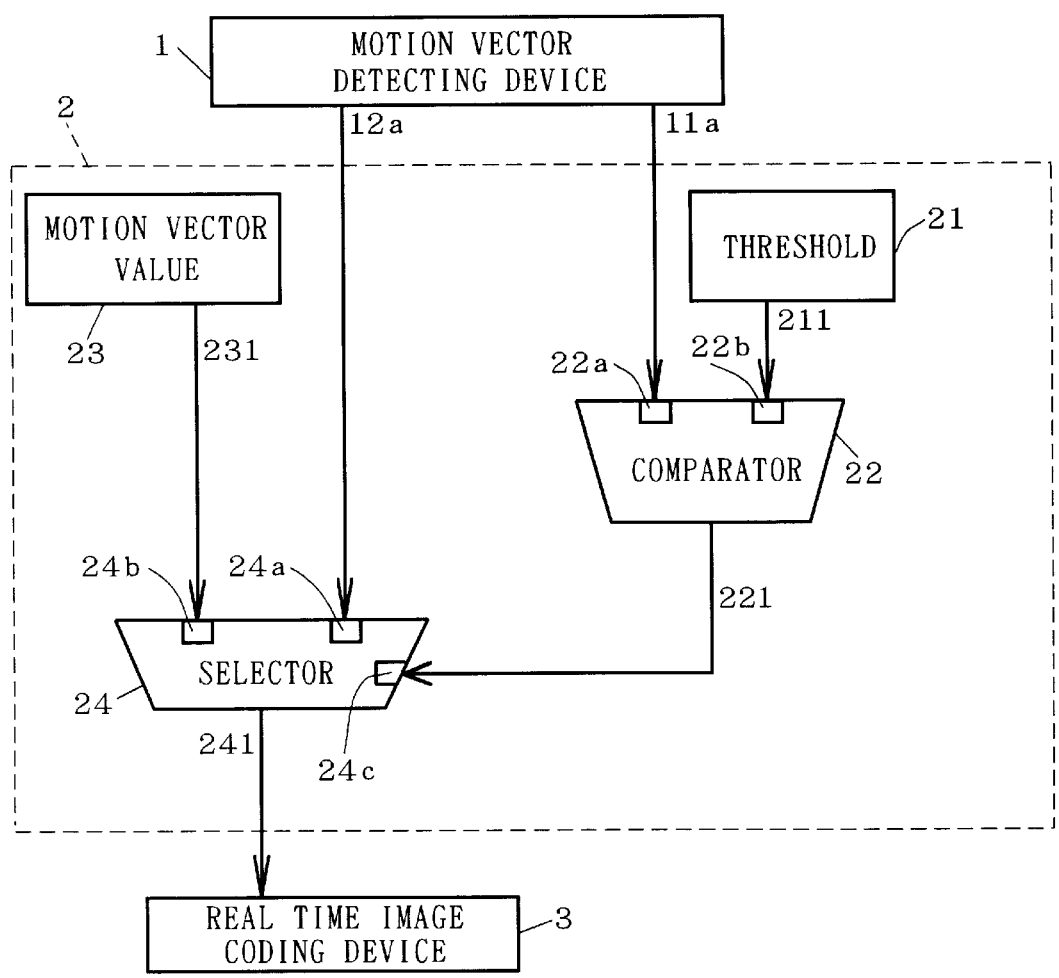
FIG. 1 is a block diagram showing a main part of an image coding apparatus according to a first embodiment of the present invention.

FIG. 1 is a block diagram showing a main part of an image coding apparatus according to a first embodiment of the present invention. The image coding apparatus performs predictive coding for a first image in a coding object image plane by using motion information about a motion of the first image from a certain position in a reference image plane.

First of all, a structure of the image coding apparatus shown in FIG. 1 will be described below. The image coding apparatus according to the present embodiment comprises a motion vector detecting device 1, an information selecting device 2 and a real time image coding device 3.

Figure 2:
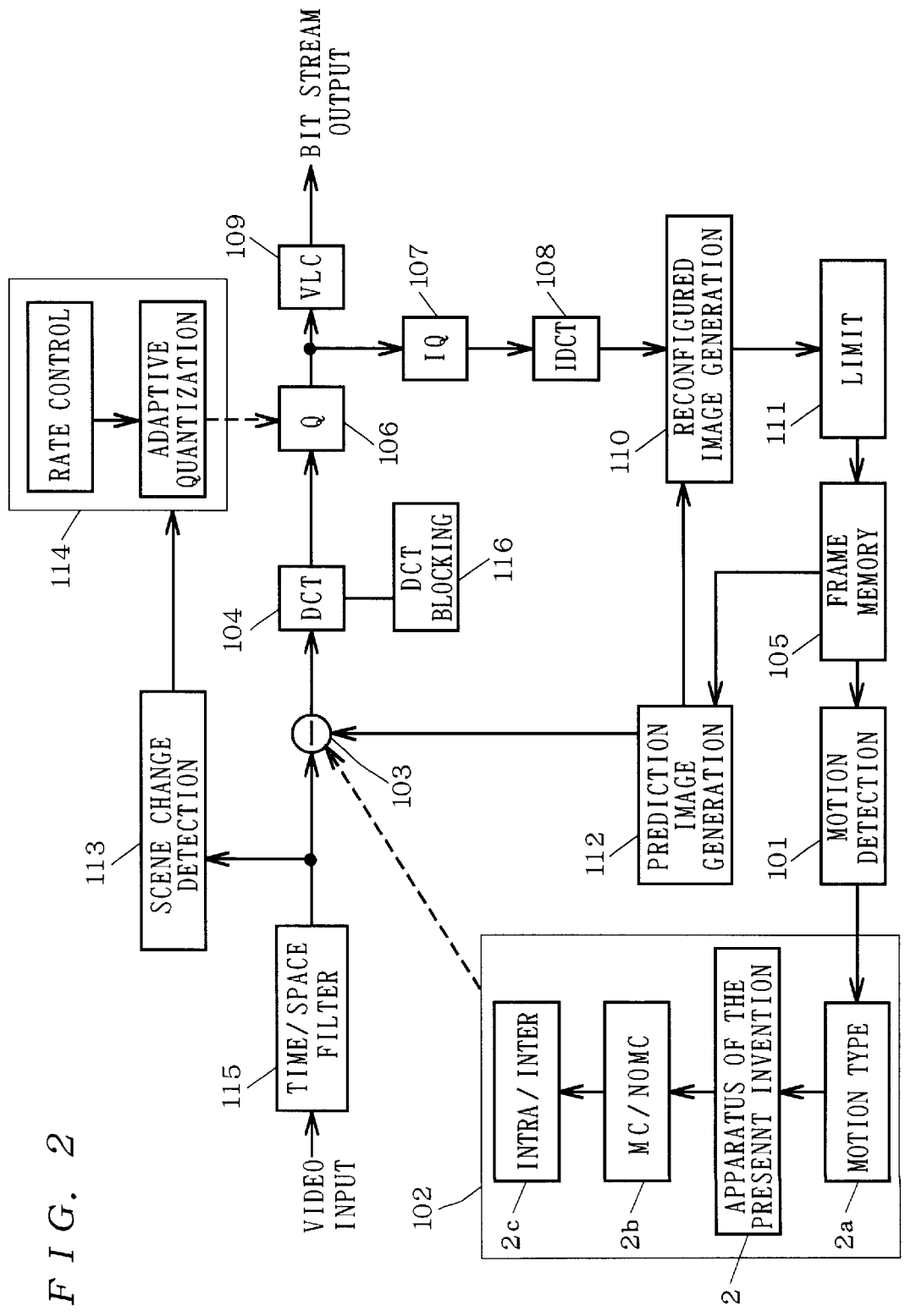
FIG. 2 is a block diagram showing a function of MPEG2 to which the present invention is applied.
Figure 25:
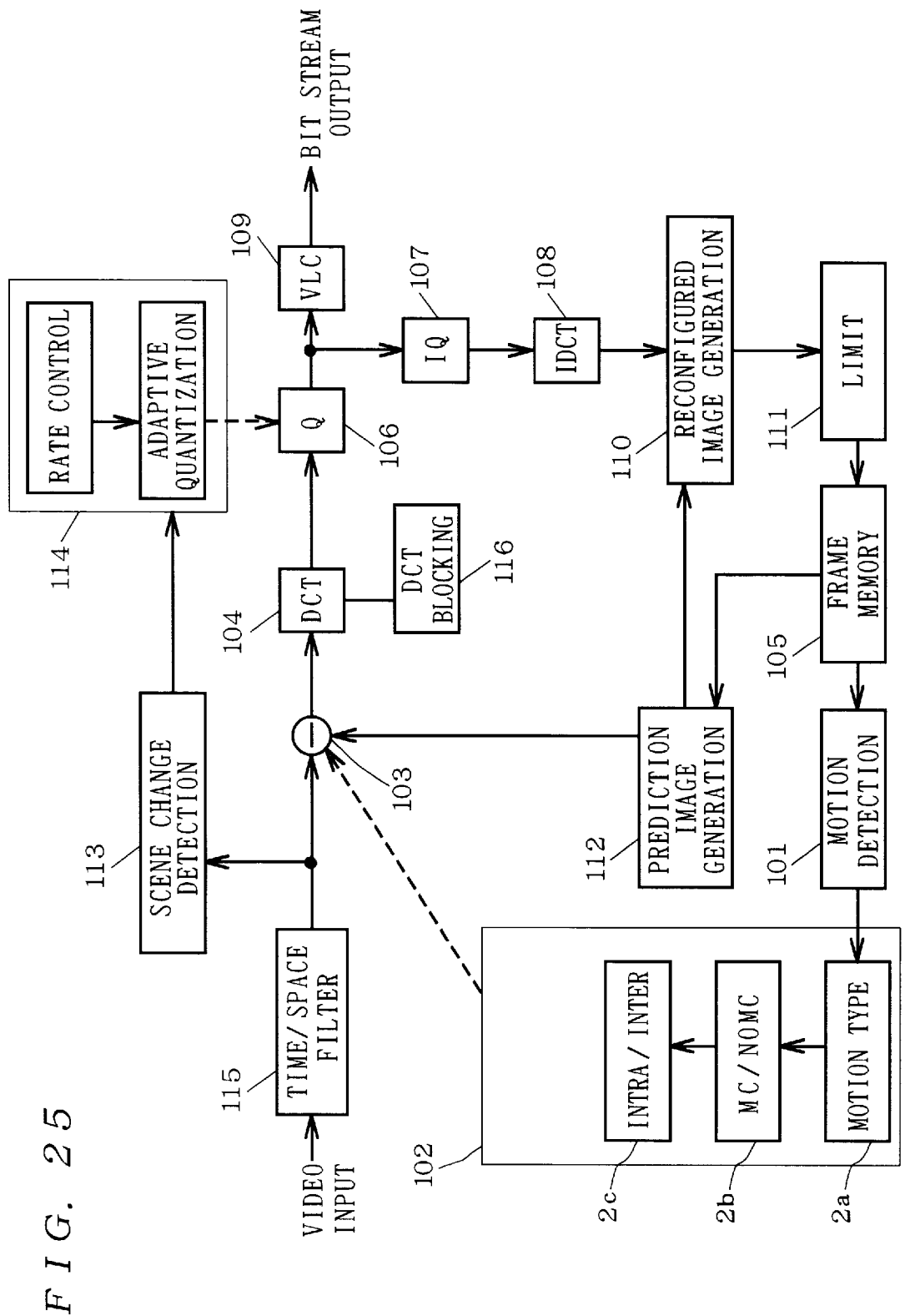
FIG. 25 is a block diagram showing a function of MPEG2 according to the prior art.

In MPEG2, for example, a function of the information selecting device 2 is incorporated into a function block 102 of the image coding apparatus as shown in FIG. 2. Other designations in FIG. 2 correspond to those in FIG. 25. A function of the motion vector detecting device 1 is equivalent to a function block 101. A function of the real time image coding device 3 is equivalent to a function block 103.

An internal structure of the information selecting device 2 according to the present embodiment is as follows. A comparator 22 receives, at nodes 22a and 22b, an evaluation value 11a output from the motion vector detecting device 1 and a threshold 211 output from a threshold storing section 21, respectively. A selector 24 receives, at nodes 24a, 24b and 24c, an optimum motion vector 12a output from the motion vector detecting device 1, a motion vector 231 output from a motion vector storing section 23 and a difference 221 output from the comparator 22, respectively.

The real time image coding device 3 receives a motion vector 241 output from the selector 24.

Figure 3:
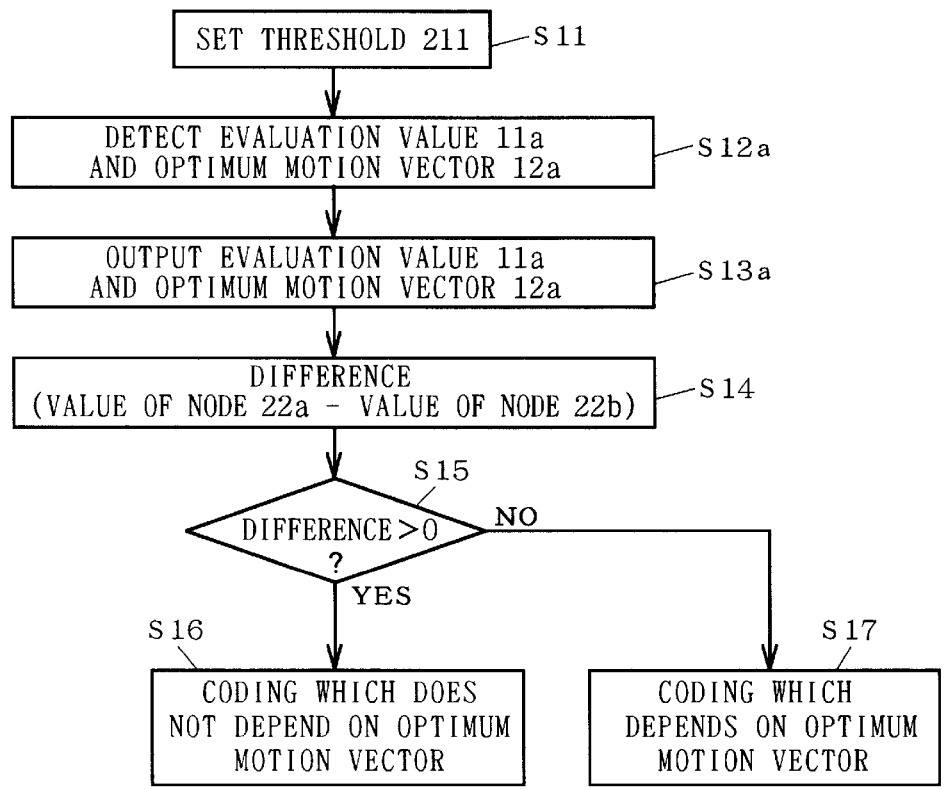
FIG. 3 is a flow chart showing an image coding method according to the first embodiment of the present invention.

Operation of the image coding apparatus shown in FIG. 1 will be described below with reference to FIG. 3. The threshold storing section 21 threshold storing means) presets and outputs the threshold 211 which is supposed to have a small effect of predictive coding (Step S11). The motion vector storing section 23 (displacement information storing means) previously sets and stores one motion vector 231 (second displacement information) having a great effect of the predictive coding, and outputs the same. The motion vector detecting device 1 detects the evaluation value 11a and the optimum motion vector 12a (Step S12a).

For example, the evaluation value 11a and the optimum motion vector 12a can be detected in the following manner.

Figure 4:
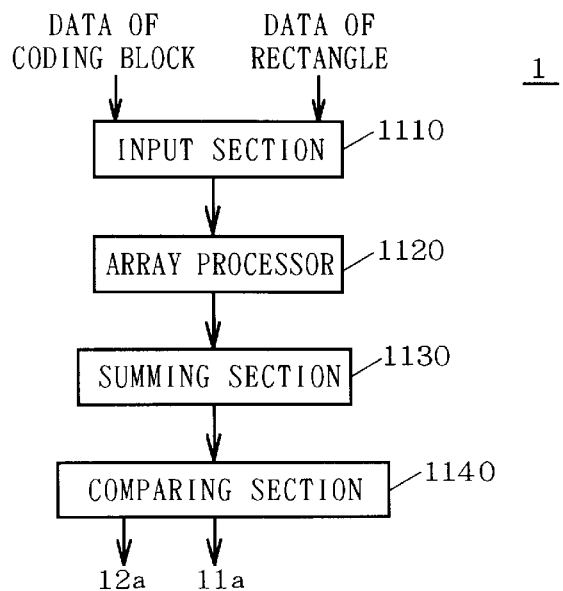
FIG. 4 is a block diagram showing an example of an internal structure of a motion vector detecting device 1.
Figure 26:
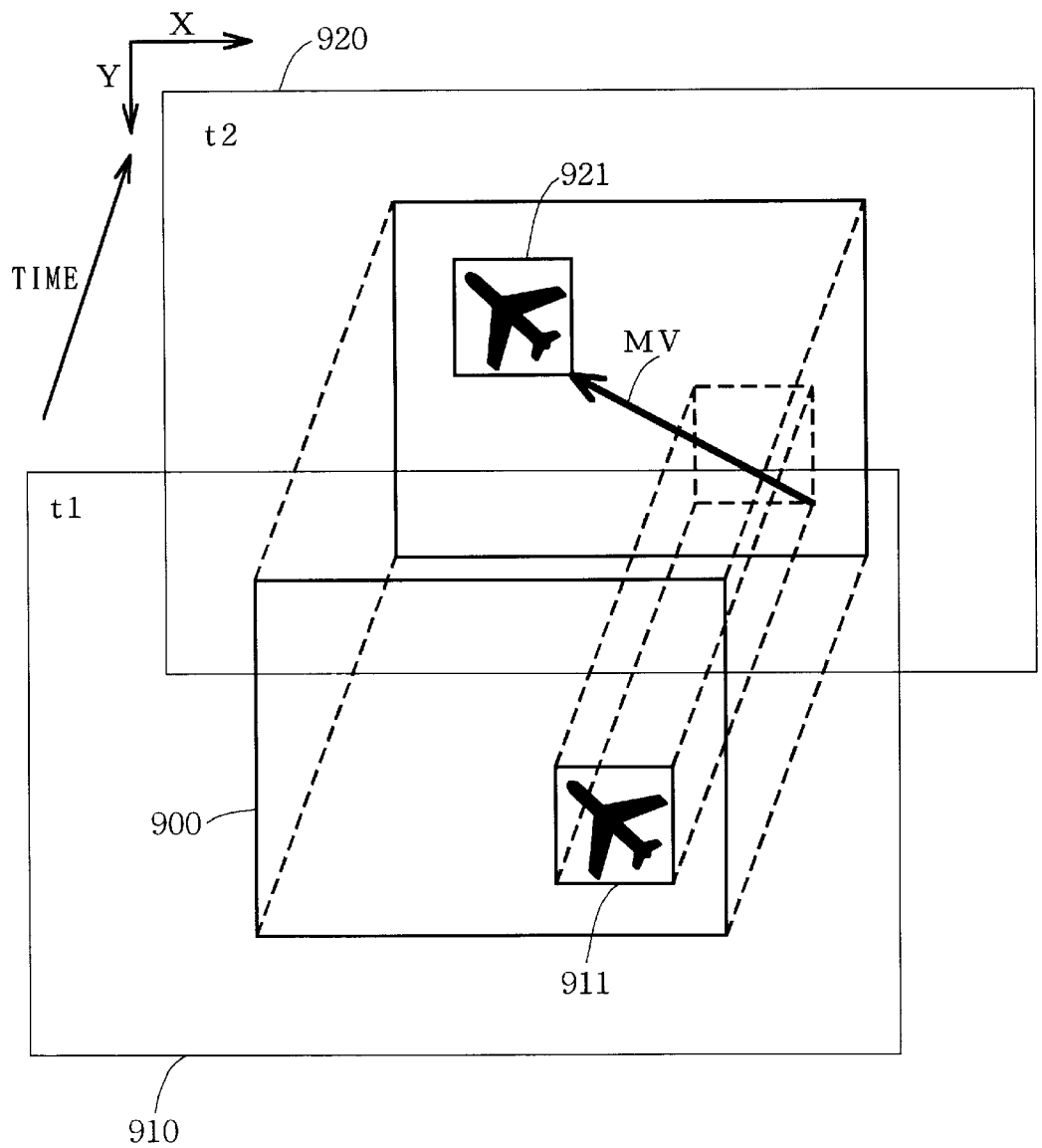
FIG. 26 is a diagram for explaining a motion vector.

FIG. 4 is a block diagram showing an example of an internal structure of the motion vector detecting device 1. It is assumed that there are a reference image plane 910 at a time t1 and a coding object image plane 920 at a time t2 shown in FIG. 26. An area 900 is determined depending on a position of a coding block 921 and ranges in a transverse direction X and a longitudinal direction Y having predetermined lengths on the basis of the position of the coding block 921. An input section 1110 shown in FIG. 4 receives data of a rectangle 911 in the area 900 and data of the coding block 921. An array processor 1120 receives the data of the rectangle 911 and that of the coding block 921 which are input to the input section 1110, and calculates a difference between each pixel data forming the data of the rectangle 911 and each pixel data forming the data of the coding block 921. A summing section 1130 calculates a sum of these differences. If the sum is smaller, the rectangle 911 is more similar to the coding block 921. Similarly, a sum of the differences is calculated for other rectangles 911 in the area 900. A comparing section 1140 detects, as the evaluation value 11a, the smallest one of the sums thus obtained, and detects a movement from a position of the rectangle 911 to that of the coding block 921 corresponding to the evaluation value 11a as one optimum motion vector 12a represented by a quantity of the movement on two-dimensional coordinates in the transverse X and longitudinal Y directions on the image plane.

Thus, the motion vector detecting device 1 (motion information detecting means) detects first displacement information (optimum motion vector) including a motion vector (first displacement quantity), to a first image, from the rectangle 911 (second image) in the reference image plane 910 corresponding to the coding block 921 (first image) in the coding object image plane 920.

The motion vector detecting device 1 outputs the evaluation value 11a and the optimum motion vector 12a (Step S13a).

The comparator 22 (comparing means) outputs the difference 221 obtained by subtracting a value of the node 22b from that of the node 22a so that the evaluation value is compared with the threshold (Step S14).

The selector 24 decides whether a value of the node 24c is greater than zero (or equal to or greater than zero). If the value of the node 24c is greater than zero (or equal to or greater than zero), the selector 24 selects a value of the node 24b and outputs the same as the motion vector 241. If not so, the selector 24 selects a value of the node 24a and outputs the same as the motion vector 241 (Step S15). Thus, the selector 24 (selecting means) selects either the first displacement information or the second displacement information.

The real time image coding device 3 performs predictive coding for the coding block 921 by using, as the motion vector 241 (motion information), an output of the information selecting device 2, that is, the first or second displacement information selected by the selecting means (Steps S16 and S17). In the function block 103 shown in FIG. 2, for example, the coding block 921 is coded on the basis of the difference between the coding object image plane and the reference image plane and the motion vector 241.

Thus, the motion vector detecting device 1, the information selecting device 2 and the real time image coding device 3 also perform the coding for other coding blocks in the coding object image plane 920, and further perform the coding for a subsequent coding object image plane 920. Step S11 is executed when the threshold 211 should be reset.

It is desirable that the motion vector 231 should have a displacement (0, 0). The reason why a motion vector value having the displacement (0, 0) is used is that a coding quantity of header information of the coding block can be reduced if the coding is performed by using the motion vector having the displacement (0, 0). In MPEG1, for example, the header information includes variables of macroblock-type, motion_horizontal_forward_code, motion_horizontal_ forward_r, motion_vertical_ forward_code and motion_vertical_forward_r. The coding quantities of these variables are 1, 1 to 11, 1 to 6, 1 to 11, and 1 to 6 if the motion vector has a displacement other than (0, 0). Consequently, a sum of the coding quantities is 5 to 35. On the other hand, if the motion vector has the displacement (0, 0), the variable of macroblock_type is necessary. Consequently, the sum of the coding quantities is 2.

The present embodiment has the following effects.

If it is supposed that the predictive coding has a small effect when the optimum motion vector 12a is used, the predictive coding is performed by using the motion vector 231 so that the coding quantity of the header information can be reduced. Accordingly, a coding quantity of the coding block can be increased corresponding to a reduction in the coding quantity of the header information. Thus, a quality of the coding object image plane 920 can be enhanced.

If the threshold which is supposed to have the small effect of the predictive coding is preset to the threshold storing section 21, it can automatically be decided whether the optimum motion vector 12a is used for the coding or not.

Second Embodiment

Figure 5:
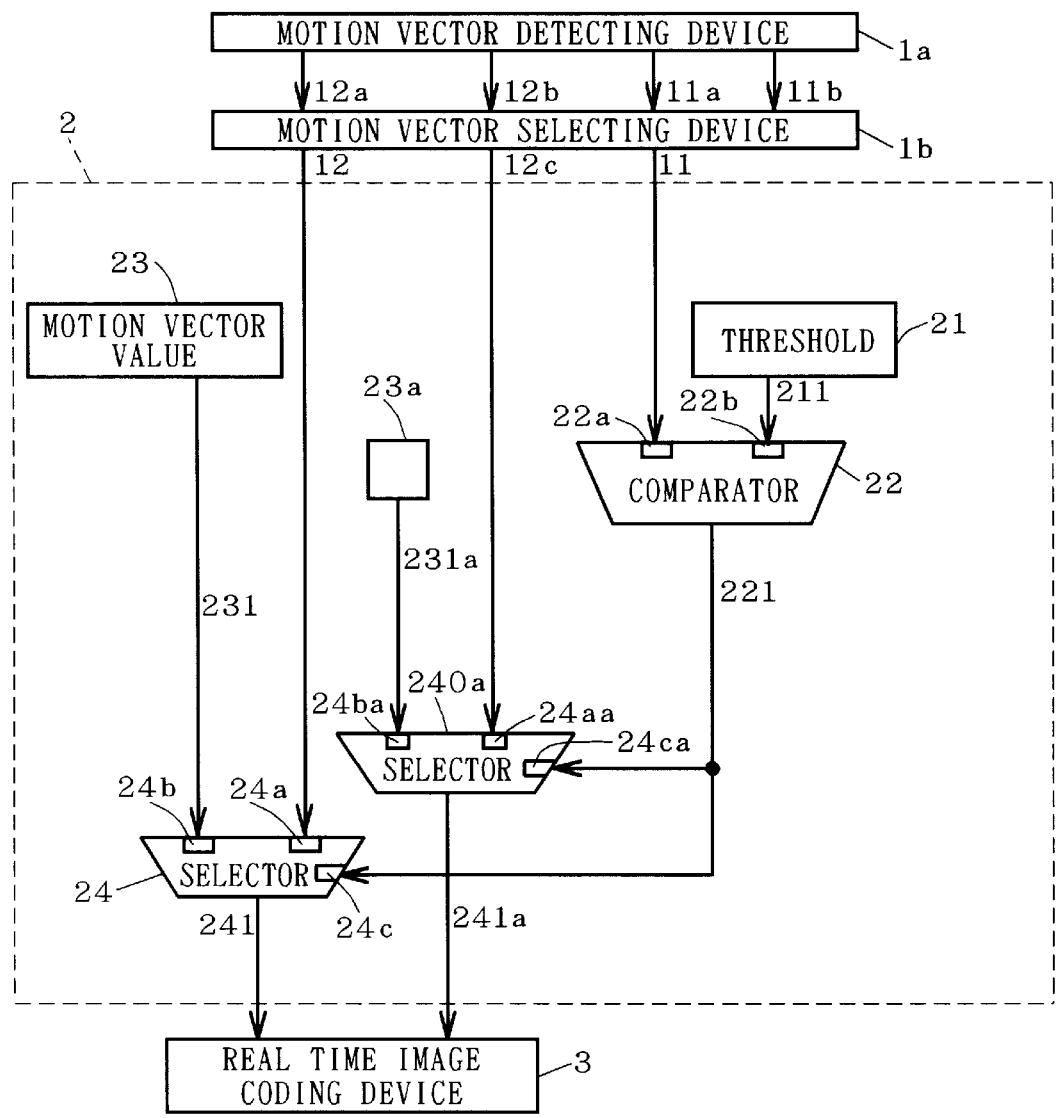
FIG. 5 is a block diagram showing a main part of an image coding apparatus according to a second embodiment of the present invention.

FIG. 5 is a block diagram showing a main part of an image coding apparatus according to a second embodiment of the present invention.

A structure of the image coding apparatus shown in FIG. 5 will be described below. A motion vector selecting device 1b receives an evaluation value 11a, an evaluation value 11b, an optimum motion vector 12a and an optimum motion vector 12b which are output from a motion vector detecting device 1a.

An internal structure of an information selecting device 2 according to the present embodiment is as follows. A node 24a of a selector 24 receives an optimum motion vector 12 output from the motion vector selecting device 1b. A selector 240a receives, at nodes 24aa, 24ba and 24ca, a mode value 12c output from the motion vector selecting device 1b, a mode value 231a output from a mode storing section 23a and a difference 221 output from a comparator 22, respectively.

A real time image coding device 3 according to the present embodiment receives a motion vector 241 and a mode value 241a which are output from the information selecting device 2.

Other structures in FIG. 5 are the same as the structure shown in FIG. 1.

A motion vector storing section 23 and the mode storing section 23a form displacement information storing means. The mode value 12c (first mode information) and the optimum motion vector 12 form first displacement information. The mode value 231a (second mode information) and a motion vector 231 form second displacement information.

Figure 6:
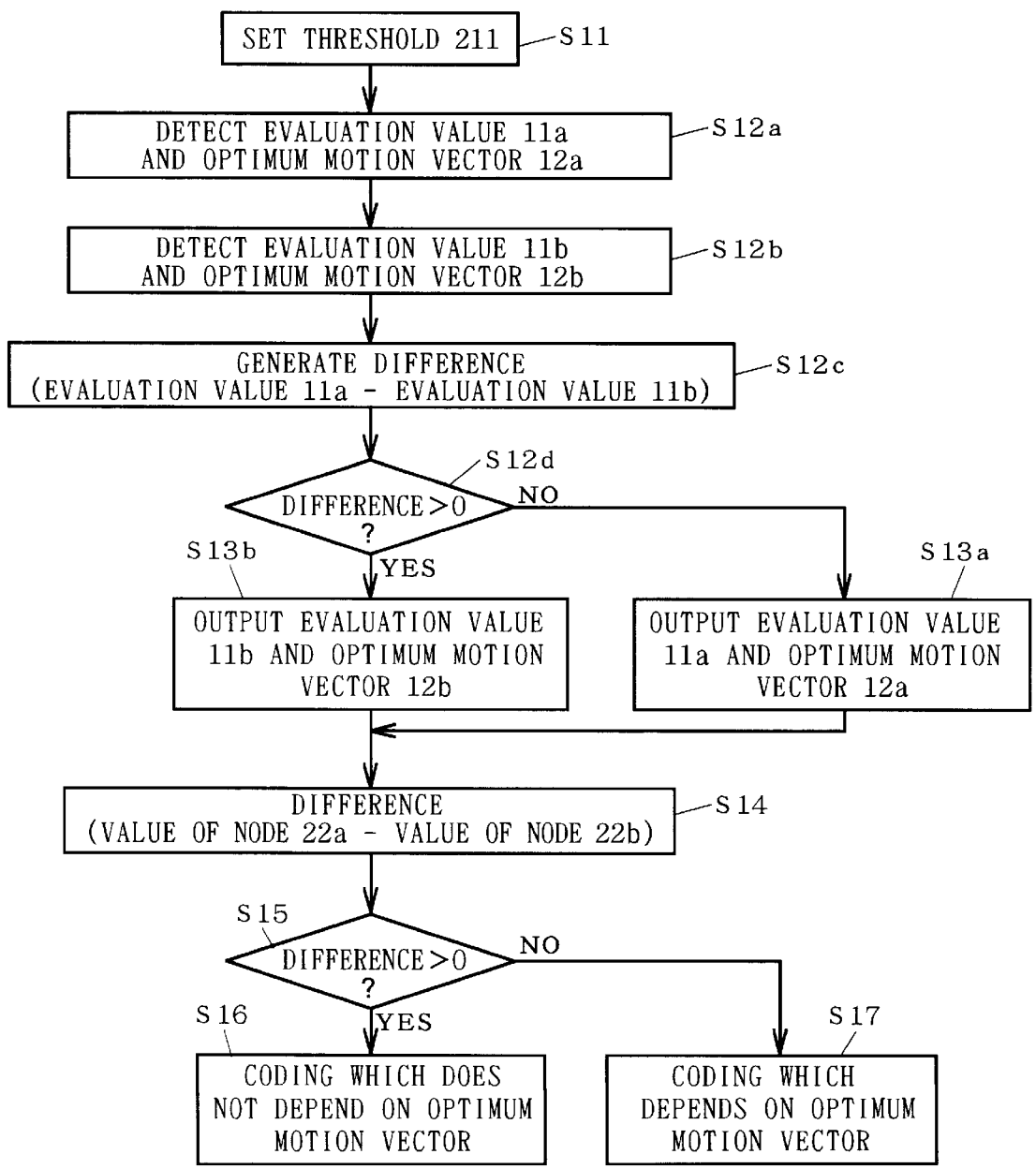
FIG. 6 is a flow chart showing an image coding method according to the second embodiment of the present invention.

FIG. 6 is a flow chart showing operation of the image coding apparatus according to the second embodiment of the present invention.

First of all, Step S11 is executed in the same manner as in the first embodiment. The mode storing section 23a presets and outputs the mode value 231a corresponding to one motion vector 231.

Next, the motion vector detecting device 1a detects the evaluation value 11a and the optimum motion vector 12a (Step S12a), and detects the evaluation value 11b and the optimum motion vector 12b (Step S12b) in the same manner as in the first embodiment.

Figure 7:
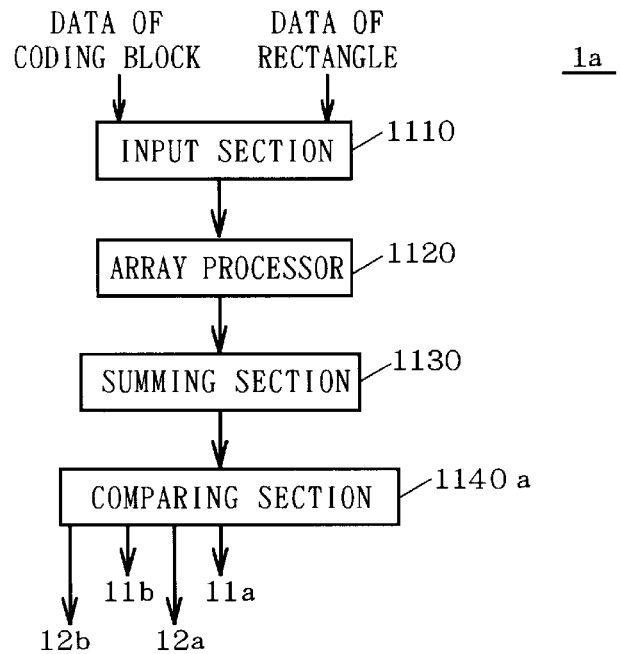
FIG. 7 is a block diagram showing an example of an internal structure of a motion vector detecting device.

For example, the evaluation values 11a and 11b and the optimum motion vectors 12a and 12b can be detected in the following manner. FIG. 7 is a block diagram showing an example of an internal structure of the motion vector detecting device 1a. In the structure shown in FIG. 7, the comparing section 1140 shown in FIG. 4 is replaced with a comparing section 1140a. First of all, when an input section 1110 shown in FIG. 7 receives data of a rectangle 911 (second image) in an area 900 and that of a coding block 921, the comparing section 1140a detects the evaluation value 11a and the optimum motion vector 12a in the same manner as in the motion vector detecting device 1.

Next, when the input section 1110 receives data of a half of the rectangle 911 in the area 900 and that of a half of the coding block 921, the comparing section 1140a detects a first evaluation value and a first optimum motion vector corresponding to the half of the coding block 921 in the same manner as in the motion vector detecting device 1. Then, when the input section 1110 receives data of a residual half of the rectangle 911 and that of a residual half of the coding block 921, the comparing section 1140a detects a second evaluation value and a second optimum motion vector for a residual half region of the coding block 921 in the same manner as in the motion vector detecting device 1. The comparing section 1140a detects a sum of the first and second evaluation values as the evaluation value 11b, and detects the first and second optimum motion vectors as a set of optimum motion vectors 12b.

The motion vector selecting device 1b generates a difference which is obtained by subtracting the evaluation value 11b from the evaluation value 11a (Step S12c), and decides whether the difference is greater than zero (or equal to or greater than zero) (Step S12d). If the difference is greater than zero (or equal to or greater than zero), the motion vector selecting device 1b selects the evaluation value 11b and the optimum motion vector 12b, and outputs them as an evaluation value 11 and an optimum motion vector 12, respectively (Step S13b). If not so, the motion vector selecting device 1b selects the evaluation value 11a and the optimum motion vector 12a, and outputs them as the evaluation value 11 and the optimum motion vector 12, respectively (Step S13a). In this case, the motion vector selecting device 1b outputs the mode value 12c indicative of the fact that the optimum motion vector 12 is one optimum motion vector 12a or a set of optimum motion vectors 12b.

Next, Steps S14 and S15 are executed in the same manner as in the first embodiment. At Step S15 according to the present embodiment, the selector 240a also performs the same operation as that of the selector 24. In other words, the selector 240a decides whether a value of the node 24ca is greater than zero (or equal to or greater than zero). If the value of the node 24ca is greater than zero (or equal to or greater than zero), the selector 240a selects a value of the node 24ba and outputs the same as the mode value 241a. If not so, the selector 240a selects a value of the node 24aa and outputs the same as the mode value 241a.

Then, Step S16 or S17 is executed in the same manner as in the first embodiment. At Steps S16 and S17 according to the present embodiment, the coding block 921 is coded by using the mode value 241a in addition to the motion vector 241. For example, when the coding block 921 is coded on the basis of a difference between a coding object image plane and a reference image plane and the motion vector 241 in the function block 103 shown in FIG. 2, the function block 103 can decide, according to the mode value 241a, whether the motion vector 241 is the optimum motion vector 12a or 12b.

Thus, the motion vector detecting device 1a, the motion vector selecting device 1b, the information selecting device 2 and the real time image coding device 3 also perform the coding for other coding blocks in a coding object image plane 920, and further perform the coding for a subsequent coding object image plane 920. Step S11 is executed when a threshold 211 should be reset.

According to the present embodiment, the following effects can be obtained in addition to the effects of the first embodiment.

A coding quantity of header information is reduced more if the motion vector 241 is one motion vector. Accordingly, when it is supposed that the optimum motion vector 12 is the optimum motion vector 12b and a small effect of predictive coding is obtained by using the optimum motion vector 12b, the predictive coding is performed by using the motion vector 231 and the mode value 231a indicative thereof so that the coding quantity of the header information can be reduced. Accordingly, a coding quantity of the coding block can be increased corresponding to a reduction in the coding quantity of the header information. Thus, a quality of the coding object image plane 920 can be enhanced.

Third Embodiment

Figure 8:
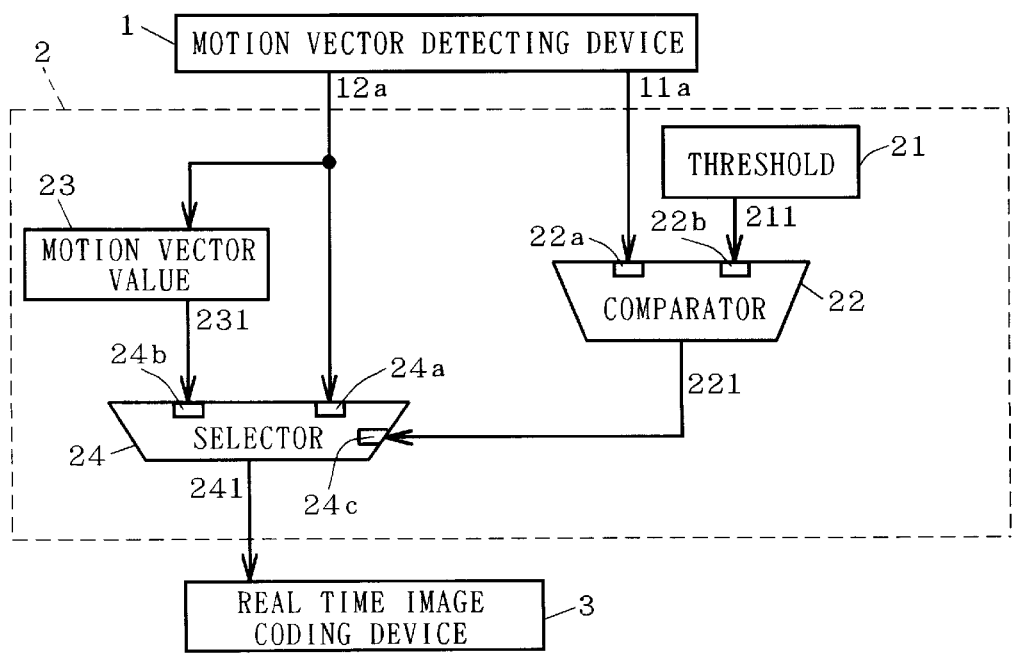
FIG. 8 is a block diagram showing a main part of an image coding apparatus according to a third embodiment of the present invention.

FIG. 8 is a block diagram showing a main part of an image coding apparatus according to a third embodiment of the present invention.

A motion vector storing section 23 according to the present embodiment receives an optimum motion vector 12a. Other structures are the same as in FIG. 1.

Figure 9:
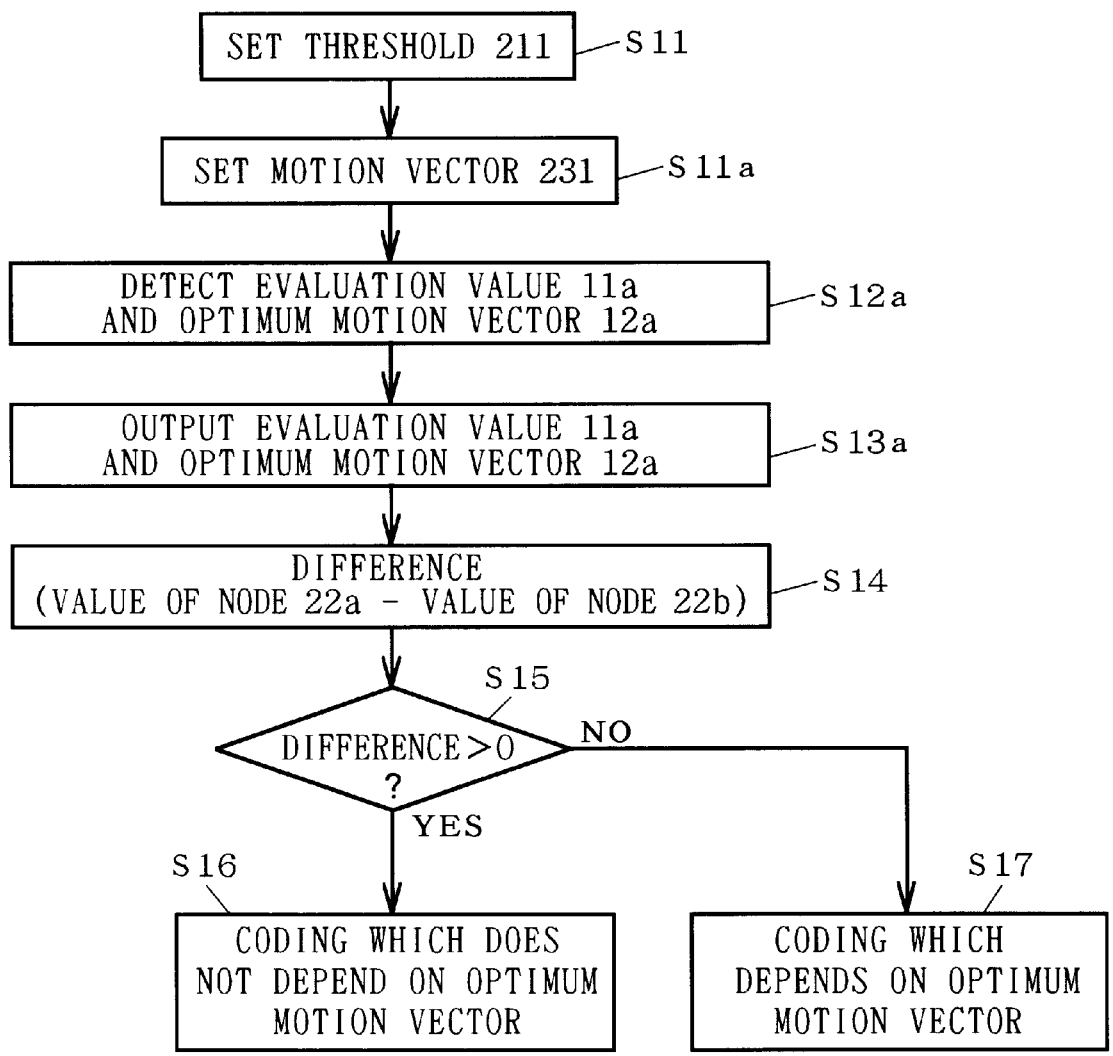
FIG. 9 is a flow chart showing an image coding method according to the third embodiment of the present invention.

FIG. 9 is a flow chart showing operation of the image coding apparatus according to the third embodiment.

The operation of the image coding apparatus shown in FIG. 8 will be described below with reference to FIG. 9. Each step other than Step S11a is the same as in the first embodiment.

At Step S11a, the following operation is performed. The motion vector storing section 23 sets the optimum motion vector 12a each time on receipt thereof. More specifically, the motion vector storing section 23 sets and stores, as one motion vector 231 having a great effect of predictive coding, the optimum motion vector 12a of a coding block which was coded last time, and outputs the same.

A real time image coding device 3 generates a difference between a current motion vector 241 and a motion vector 241 of the coding block which was coded last time, and performs variable-length coding by using the difference. For example, a coding block 921 is coded on the basis of a difference between a coding object image plane and a reference image plane and the motion vector 241 in the function block 103 shown in FIG. 2. In this case, a difference is generated between a motion vector on a coding object image plane side, that is, the current motion vector and a motion vector on a reference image plane side, that is, the motion vector of the coding block which was coded last time. The function block 103 performs the variable-length coding by using the difference.

Thus, a motion vector detecting device 1, an information selecting device 2 and the real time image coding device 3 also perform the coding for other coding blocks in a coding object image plane 920, and further perform the coding for a subsequent coding object image plane 920. Step S11 is executed when a threshold 211 should be reset.

According to the present embodiment, the following effects can be obtained in addition to the effects of the first embodiment.

The predictive coding is performed by using the above-mentioned difference generated by the real time image coding device 3. When it is supposed that a small effect of the predictive coding is obtained by using the optimum motion vector 12a, the predictive coding is performed by using the optimum motion vector 12a output, from the motion vector storing section 23, as an optimum motion vector of a coding block which was coded last time. In this case, the difference has a displacement (0, 0). Consequently, a coding quantity of header information can be reduced. Accordingly, a coding quantity of the coding block can be increased corresponding to a reduction in the coding quantity of the header information. Thus, a quality of the coding object image plane 920 can be enhanced.

Fourth Embodiment

Figure 10:
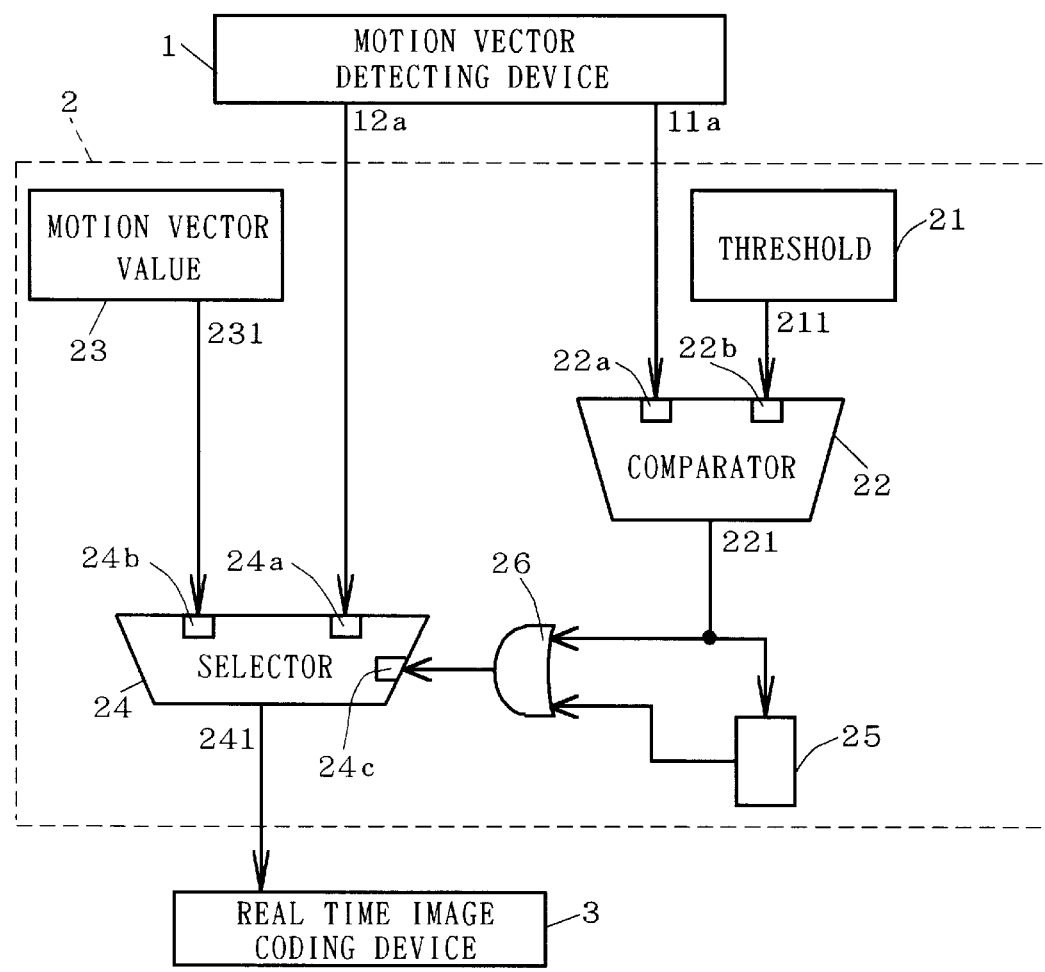
FIG. 10 is a block diagram showing a main part of an image coding apparatus according to a fourth embodiment of the present invention.

FIG. 10 is a block diagram showing a main part of an image coding apparatus according to a fourth embodiment of the present invention.

An internal structure of an information selecting device 2 according to the present embodiment is as follows. A slice storing section (specific result storing means) 25 receives a difference 221. An OR circuit 26 receives an output of the slice storing section 25 and the difference 221. A node 24c of a selector 24 receives an output of the OR circuit 26.

Other structures are the same as in FIG. 1.

Figure 11:
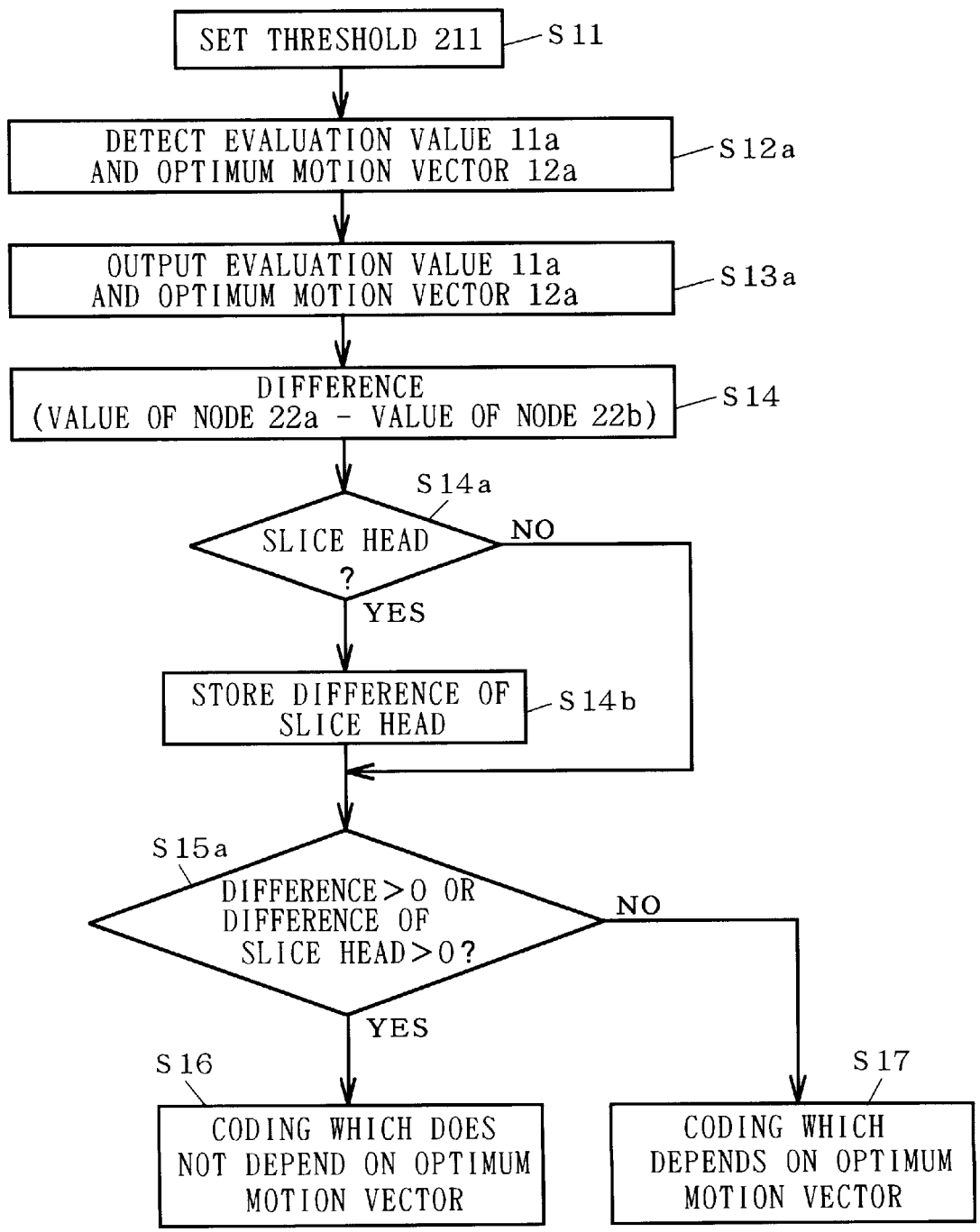
FIG. 11 is a flow chart showing an image coding method according to the fourth embodiment of the present invention.

FIG. 11 is a flow chart showing operation of the image coding apparatus according to the fourth embodiment.

The operation of the image coding apparatus shown in FIG. 10 will be described below with reference to FIG. 11.

First of all, Steps S11 to S14 are executed in the same manner as in the first embodiment.

Then, if a coding block (921 which is processed at Step S12a has been detected at a head of a slice layer (Step S14a), the slice storing section 25 stores and outputs the difference 221 (Step S14b).

If at least one of the difference 221 and the output of the slice storing section 25 is greater than zero (or equal to or greater than zero), the OR circuit 26 outputs a value which is greater than zero (or equal to or greater than zero). If not so, the OR circuit 26 outputs a value which is equal to or smaller than zero (or smaller than zero). The selector 24 performs the same operation as in the first embodiment (Step S15a).

Thus, a motion vector detecting device 1, the information selecting device 2 and a real time image coding device 3 also perform coding for other coding blocks in a coding object image plane 920, and further perform the coding for a subsequent coding object image plane 920. Step S11 is executed when a threshold 211 should be reset.

The operation according to the present embodiment is equivalently similar to that according to the first embodiment when the output of the slice storing section 25 is equal to or smaller than zero (or smaller than zero). The slice storing section 25 stores the difference 221 for each head of the slice layer. Therefore, the same value is output while all the coding blocks in the coding object image plane 920 are being coded.

Thus, the slice storing section 25 and the OR circuit 26 detect a correlation between the coding object image plane 920 and a reference image plane 910 on the basis of an evaluation value for the head of the slice layer. The head of the slice layer forming the coding object image plane 920 is used for the following reason. In general, an image is less changed on a periphery of an image plane than a center thereof. The head of the slice layer is positioned on the corner of the periphery of the coding object image plane 920. When the image in the head of the slice layer is changed, the whole image plane is often varied. If the difference 221 stored in the slice storing section 25 is greater than zero (or equal to or greater than zero), the correlation between the coding object image plane 920 and the reference image plane 910 is low. If not so, the correlation is high.

According to the present embodiment, the following effects can be obtained in addition to the effects of the first embodiment.

The slice storing section 25 and the OR circuit 26 detect the correlation between the coding object image plane 920 and the reference image plane 910 on the basis of the evaluation value for the head of the slice layer. When it is detected that the correlation is low, predictive coding is performed by using a motion vector 231. Consequently, a coding quantity of header information can be reduced. Accordingly, a coding quantity of the coding block can be increased corresponding to a reduction in the coding quantity of the header information. Thus, a quality of the coding object image plane 920 can be enhanced.

When it is detected that the correlation is low, the motion vector 231 is continuously output as a motion vector 241 while all the coding blocks in the coding object image plane 920 are being coded. As described in the third embodiment, the real time image coding device 3 generates a difference between the motion vector 241 and the motion vector 241 of the coding block which was coded last time, and performs variable-length coding by using the difference. Accordingly, even if the motion vector 231 has a displacement other than (0, 0), the difference generated by the real time image coding device 3 has the displacement (0, 0). Consequently, the coding quantity of the header information can be reduced. As a result, the coding quantity of the coding block can be increased corresponding to a reduction in the coding quantity of the header information. Thus, a quality of the coding object image plane 920 can be enhanced.

Fifth Embodiment

Figure 12:
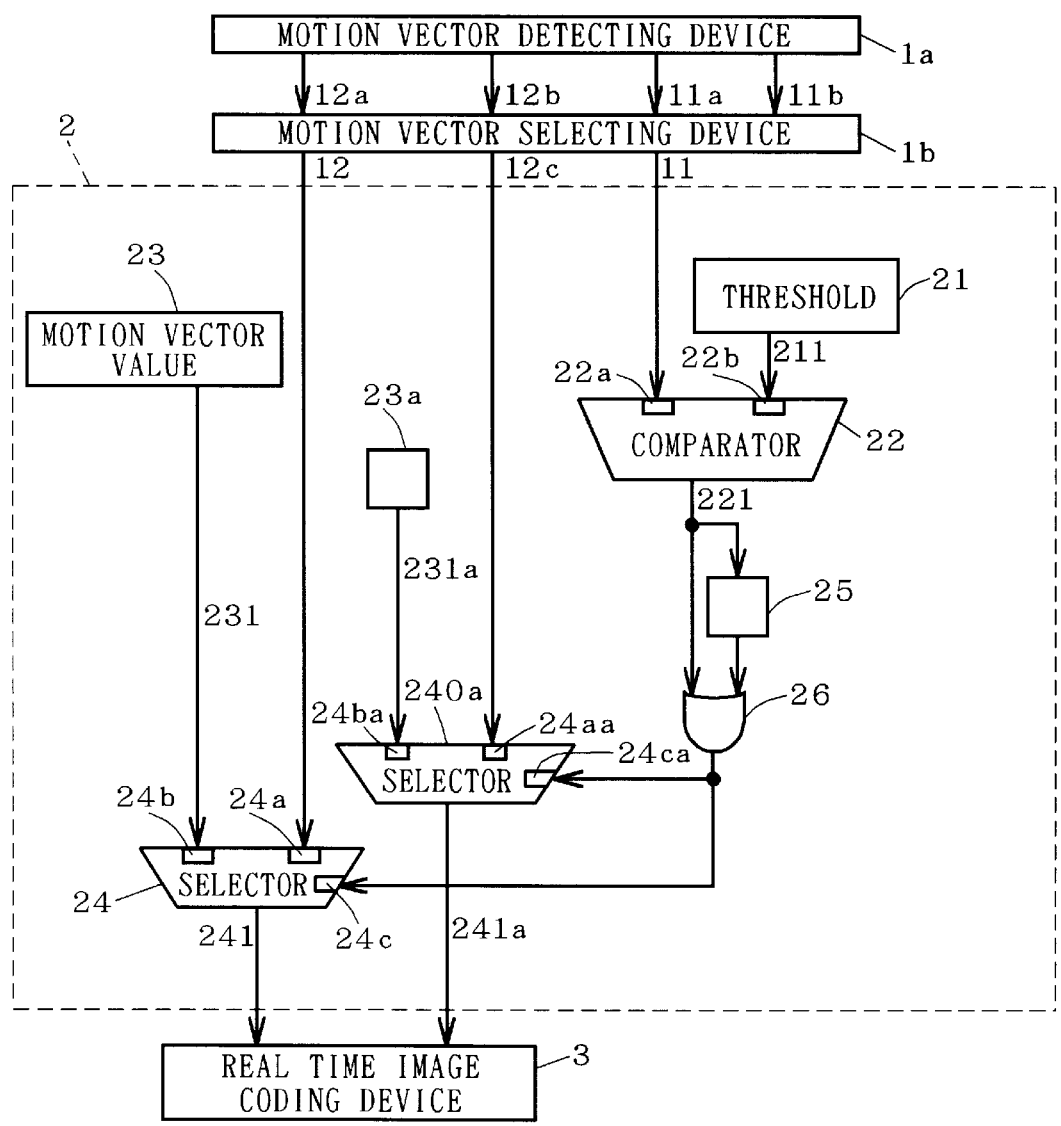
FIG. 12 is a block diagram showing a main part of an image coding apparatus according to a fifth embodiment of the present invention.

FIG. 12 is a block diagram showing a main part of an image coding apparatus according to a fifth embodiment of the present invention.

An internal structure of an information selecting device 2 according to the present embodiment is as follows. Selectors 24 and 240a receive an output of an OR circuit 26 at nodes 24c and 24ca, respectively.

Other structures are the same as in FIGS. 5 and 10.

Figure 13:
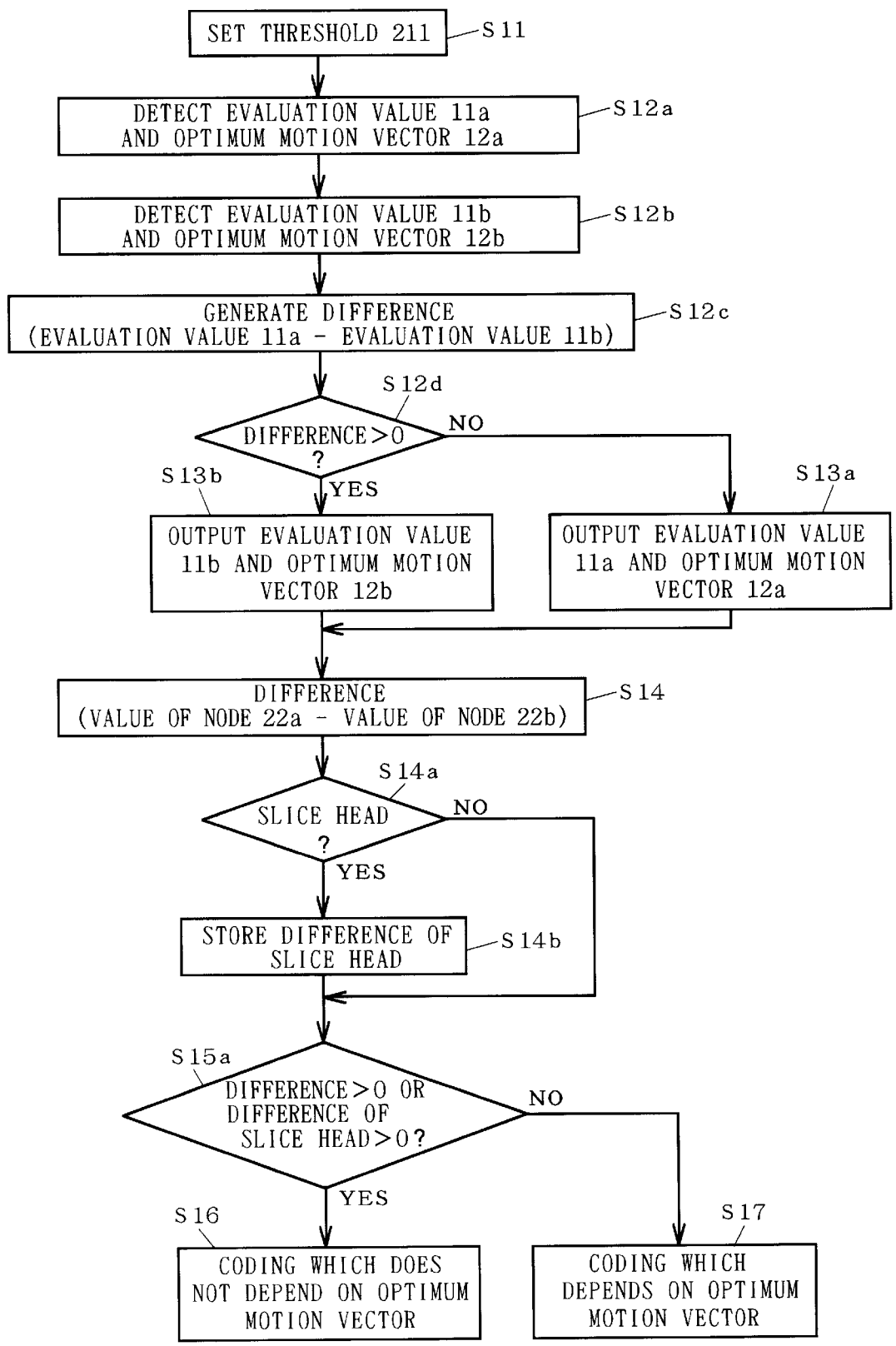
FIG. 13 is a flow chart showing an image coding method according to the fifth embodiment of the present invention.

FIG. 13 is a flow chart showing operation of the image coding apparatus according to the fifth embodiment.

First of all, Steps S11 to S14 are executed in the same manner as in the second embodiment.

Then, Steps S14a to S15a are executed in the same manner as in the fourth embodiment.

Thereafter, Steps S16 and S17 are executed in the same manner as in the second embodiment.

Thus, a motion vector detecting device 1a, the information selecting device 2 and a real time image coding device 3 also perform coding for other coding blocks in a coding object image plane 920, and further perform the coding for a subsequent coding object image plane 920. Step S11 is executed when a threshold 211 should be reset.

According to the present embodiment, the same effects as in the second and fourth embodiments can be obtained.

Sixth Embodiment

Figure 14:
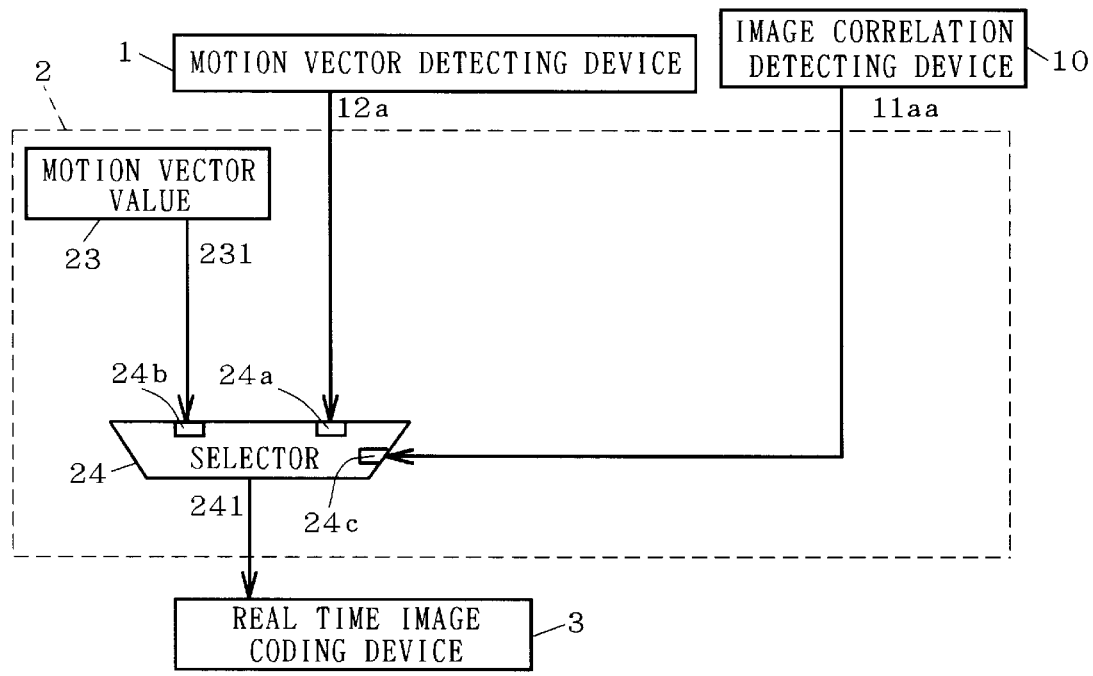
FIG. 14 is a block diagram showing a main part of an image coding apparatus according to a sixth embodiment of the present invention.

FIG. 14 is a block diagram showing a main part of an image coding apparatus according to a sixth embodiment of the present invention.

An internal structure of an information selecting device 2 according to the present embodiment is as follows. A selector 24 receives, at a node 24c, a correlation value 11aa output from an image correlation detecting device 10. In the present embodiment, the threshold storing section 21 and the comparator 22 shown in FIG. 1 are omitted.

Other structures are the same as in FIG. 1.

Figure 15:
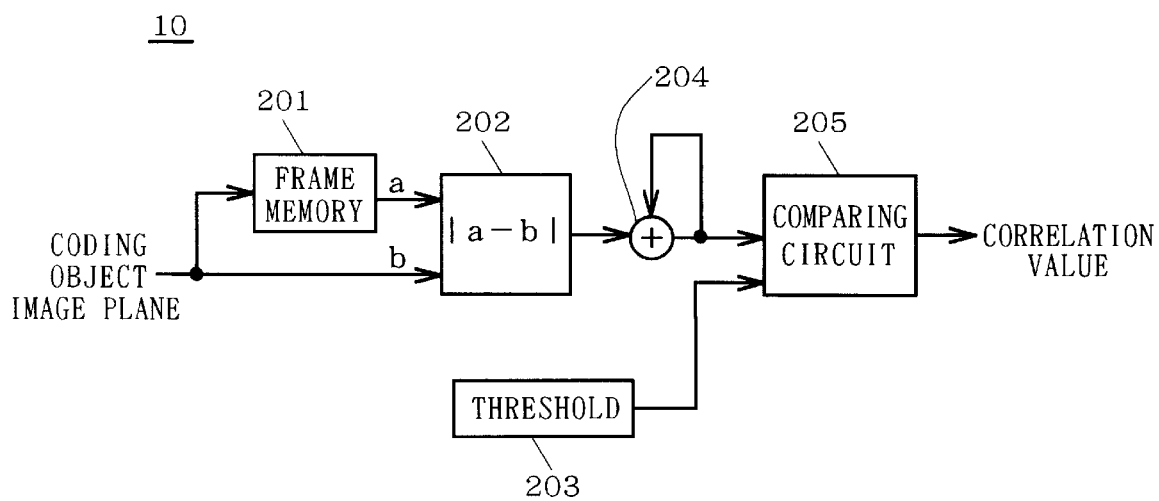
FIG. 15 is a block diagram showing an example of an image correlation detecting device 10.

The image correlation detecting device 10 serves to detect a correlation of a continuous image plane, and utilizes an existing section such as the function block 113 shown in FIG. 2, for example. FIG. 15 is a block diagram showing an example of the image correlation detecting device 10. A frame memory 201 stores an image plane previous to a coding object image plane. A subtracter 202 generates an absolute value difference between each data in the image plane stored in the frame memory 201 and each data in the coding object image plane. An adder 204 generates a cumulative sum of the absolute value differences between the data. A comparing circuit 205 compares a threshold stored in a threshold storing section 203 with the cumulative sum output from the adder 204, thereby detecting a correlation between the previous image plane and the coding object image plane.

Figure 16:
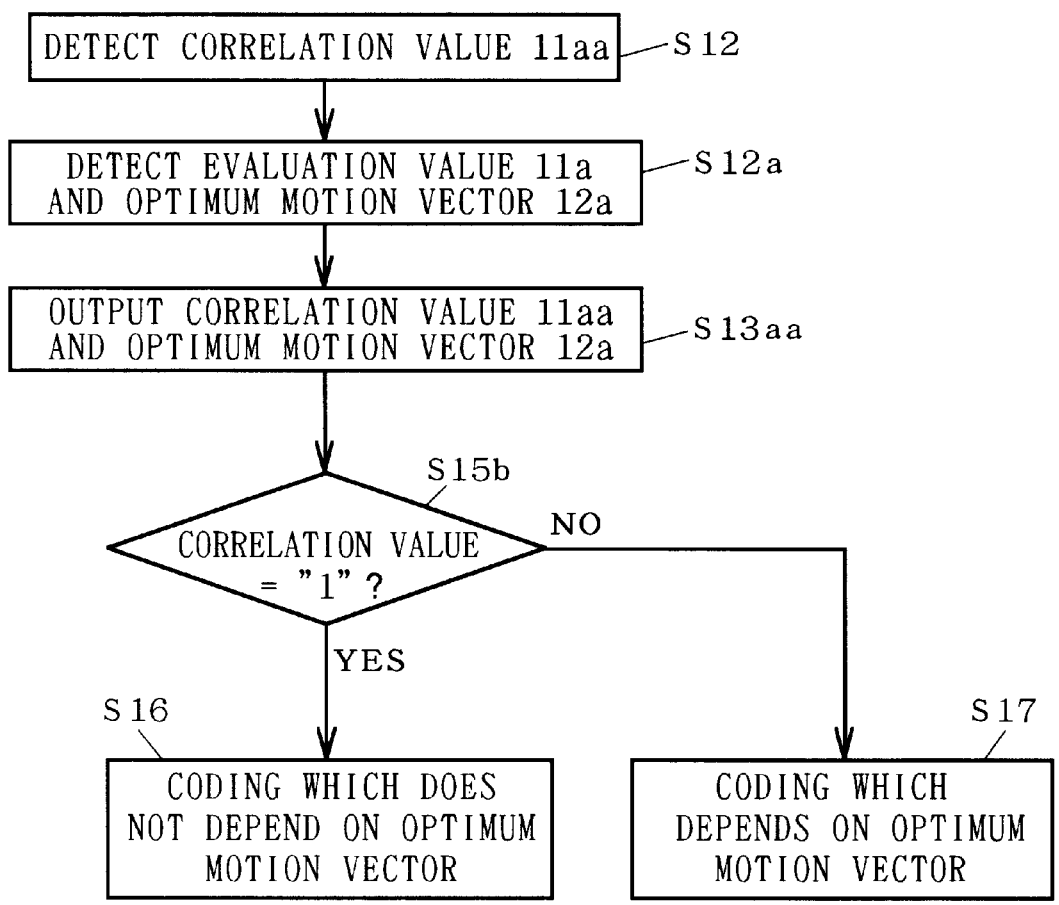
FIG. 16 is a flow chart showing an image coding method according to the sixth embodiment of the present invention.

FIG. 16 is a flow chart showing operation of the image coding apparatus according to the sixth embodiment.

The image correlation detecting device 10 (image plane correlation detecting means) detects, as a continuous image plane, a correlation between a whole reference image plane 910 and a whole coding object image plane 920. If it is decided that the correlation between the reference image plane 910 and the coding object image plane 920 is high, the image correlation detecting device 10 generates the correlation value 11aa of "0". If it is decided that the correlation between the reference image plane 910 and the coding object image plane 920 is low, the image correlation detecting device 10 generates the correlation value 11aa of "1" (Step S12).

Step S12a is executed in the same manner as in the first embodiment.

The image correlation detecting device 10 outputs the correlation value 11aa, and a motion vector detecting device 1 outputs an optimum motion vector 12a (Step S13aa).

The selector 24 decides whether a value of the node 24c is "1" or not. If the value of the node 24c is "1", the selector 24 selects a value of a node 24b and outputs the same as a motion vector 241. If not so, the selector 24 selects a value of a node 24a and outputs the same as the motion vector 241 (Step S15b).

Next, Steps S16 and S17 are executed in the same manner as in the first embodiment.

Thus, the motion vector detecting device 1, the image correlation detecting device 10, the information selecting device 2 and a real time image coding device 3 also perform coding for other coding blocks in the coding object image plane 920, and further perform the coding for a subsequent coding object image plane 920. Furthermore, Step S12a is executed each time the coding object image plane 920 is changed. Accordingly, the image correlation detecting device 10 outputs the same value while all the coding blocks of the coding object image plane 920 are being coded.

According to the present embodiment, the following effects can be obtained.

When it is detected that the correlation is low, predictive coding is performed by using a motion vector 231. Consequently, a coding quantity of header information can be reduced. Accordingly, a coding quantity of the coding block can be increased corresponding to a reduction in the coding quantity of the header information. Thus, a quality of the coding object image plane 920 can be enhanced.

When it is detected that the correlation is low, the motion vector 231 is continuously output as the motion vector 241 while all the coding blocks in the coding object image plane 920 are being coded. As described in the third embodiment, the real time image coding device 3 generates a difference between the motion vector 241 and the motion vector 241 of the coding block which was coded last time, and performs variable-length coding by using the difference. Accordingly, even if the motion vector 231 has a displacement other than (0, 0), the difference generated by the real time image coding device 3 has the displacement (0, 0). Consequently, the coding quantity of the header information can be reduced. As a result, the coding quantity of the coding block can be increased corresponding to a reduction in the coding quantity of the header information. Thus, the quality of the coding object image plane 920) can be enhanced.

By using the existing image correlation detecting device 10, the threshold storing section 21 and the comparator 22 described above in the first embodiment can be omitted. Consequently, a structure can be simplified.

Seventh Embodiment

Figure 17:
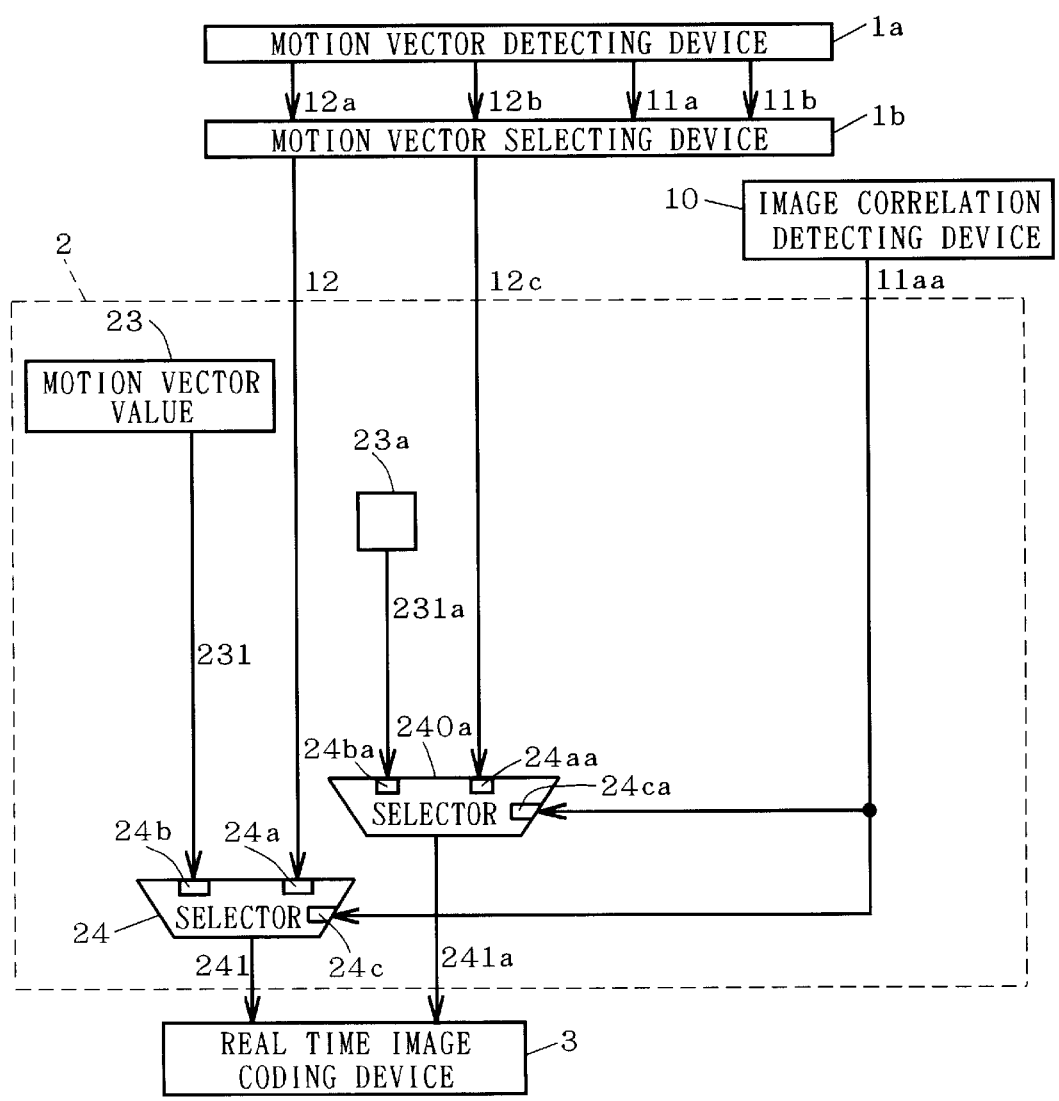
FIG. 17 is a block diagram showing a main part of an image coding apparatus according to a seventh embodiment of the present invention.

FIG. 17 is a block diagram showing a main part of an image coding apparatus according to a seventh embodiment of the present invention.

Selectors 24 and 240a receive a correlation value 11aa output from an image correlation detecting device 10 at nodes 24c and 24ca, respectively.

Other structures are the same as in FIGS. 5 and 14.

Figure 18:
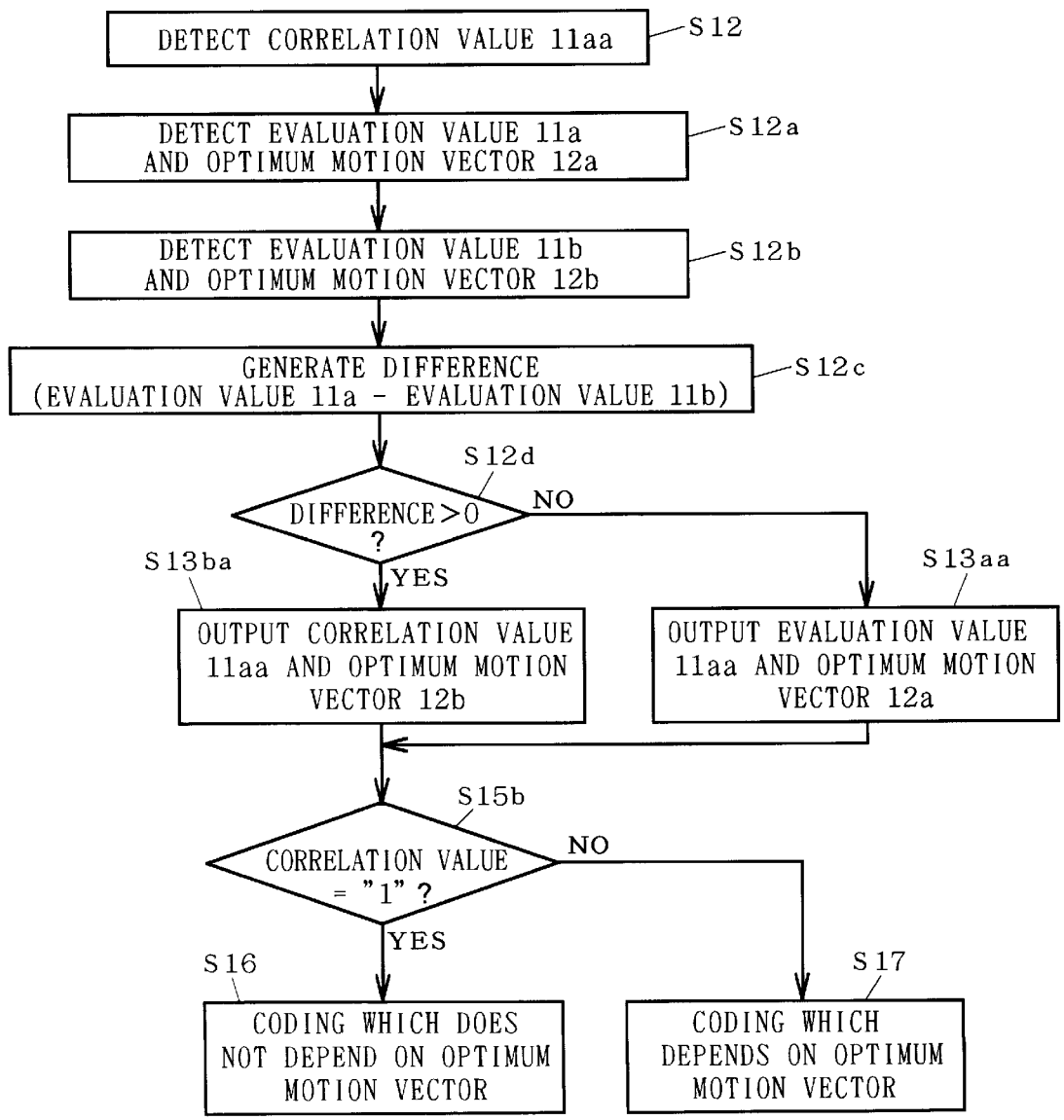
FIG. 18 is a flow chart showing an image coding method according to the seventh embodiment of the present invention.

FIG. 18 is a flow chart showing operation of the image coding apparatus according to the seventh embodiment.

First of all, Step S12 is executed in the same manner as in the sixth embodiment.

Next, Steps S12a to S12d are executed in the same manner as in the second embodiment. If a difference is greater than zero (or equal to or greater than zero), a motion vector selecting device 1b selects an optimum motion vector 12b and outputs the same as an optimum motion vector 12 (Step S13ba). If not so, the motion vector selecting device 1b selects an optimum motion vector 12a and outputs the same as the optimum motion vector 12 (Step S13aa). In this case, the image correlation detecting device 10 outputs the correlation value 11aa.

Then, Step S15b is executed in the same manner as in the sixth embodiment. At Step S15b according to the present embodiment, the selector 240a also performs the same operation as that of the selector 24. In other words, the selector 2440a decides whether a value of the node 24ca is "1" or not. If the value of the node 24ca is "1", the selector 240a selects a value of a node 24ba and outputs the same as a motion vector 241a. If not so, the selector 240a selects a value of a node 24aa and outputs the same as the motion vector 241a.

Thereafter, Steps S16 and S17 are executed in the same manner as in the second embodiment.

Thus, a motion vector detecting device 1a, the motion vector selecting device 1b, the image correlation detecting device 10, an information selecting device 2 and a real time image coding device 3 also perform coding for other coding blocks in a coding object image plane 920, and further perform the coding for a subsequent coding object image plane 920. Step S12a is executed each time the coding object image plane 920 is changed. Accordingly, the image correlation detecting device 10 outputs the same value while all the coding blocks of the coding object image plane 920 are being coded.

According to the present embodiment, the same effects as in the second and sixth embodiments can be obtained.

Eighth Embodiment

Figure 19:
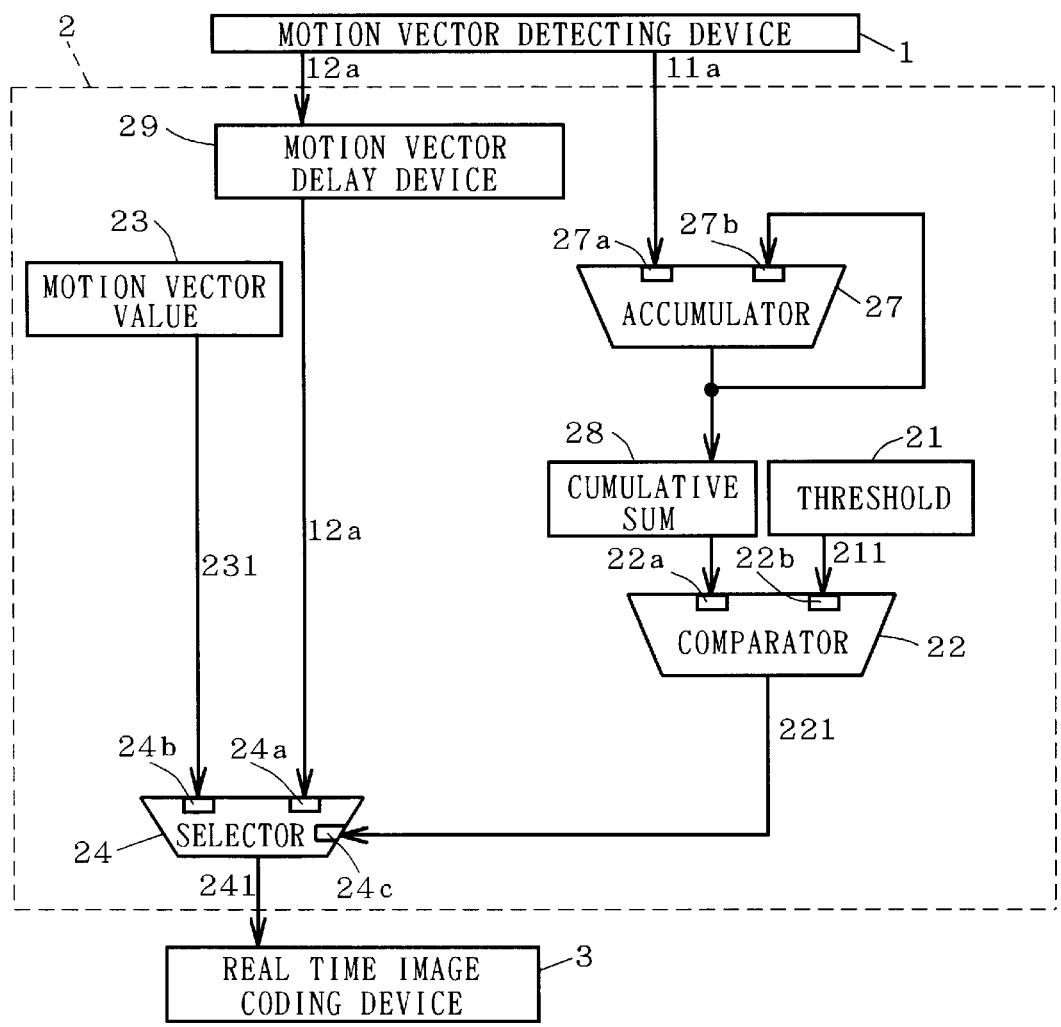
FIG. 19 is a block diagram showing a main part of an image coding apparatus according to an eighth embodiment of the present invention.

FIG. 19 is a block diagram showing an image coding apparatus according to an eighth embodiment of the present invention.

An internal structure of an information selecting device 2 according to the present embodiment is as follows. An accumulator 27 receives, at nodes 27a and 27b, an evaluation value 11a output from a motion vector detecting device 1 and an output of the accumulator 27, respectively. A cumulative sum storing section 28 formed by a flip-flop circuit receives the output of the accumulator 27. A comparator 22 receives an output of the cumulative sum storing section 28 at a node 22a. A motion vector delay device 29 (delay means) receives an optimum motion vector 12a output from the motion vector detecting device 1. A selector 24 receives, at a node 24a, the optimum motion vector 12a output from the motion vector delay device 29. The accumulator 27 and the cumulative sum storing section 28 form sum storing means for generating a sum of evaluation values.

Other structures are the same as in FIG. 1.

Figure 20:
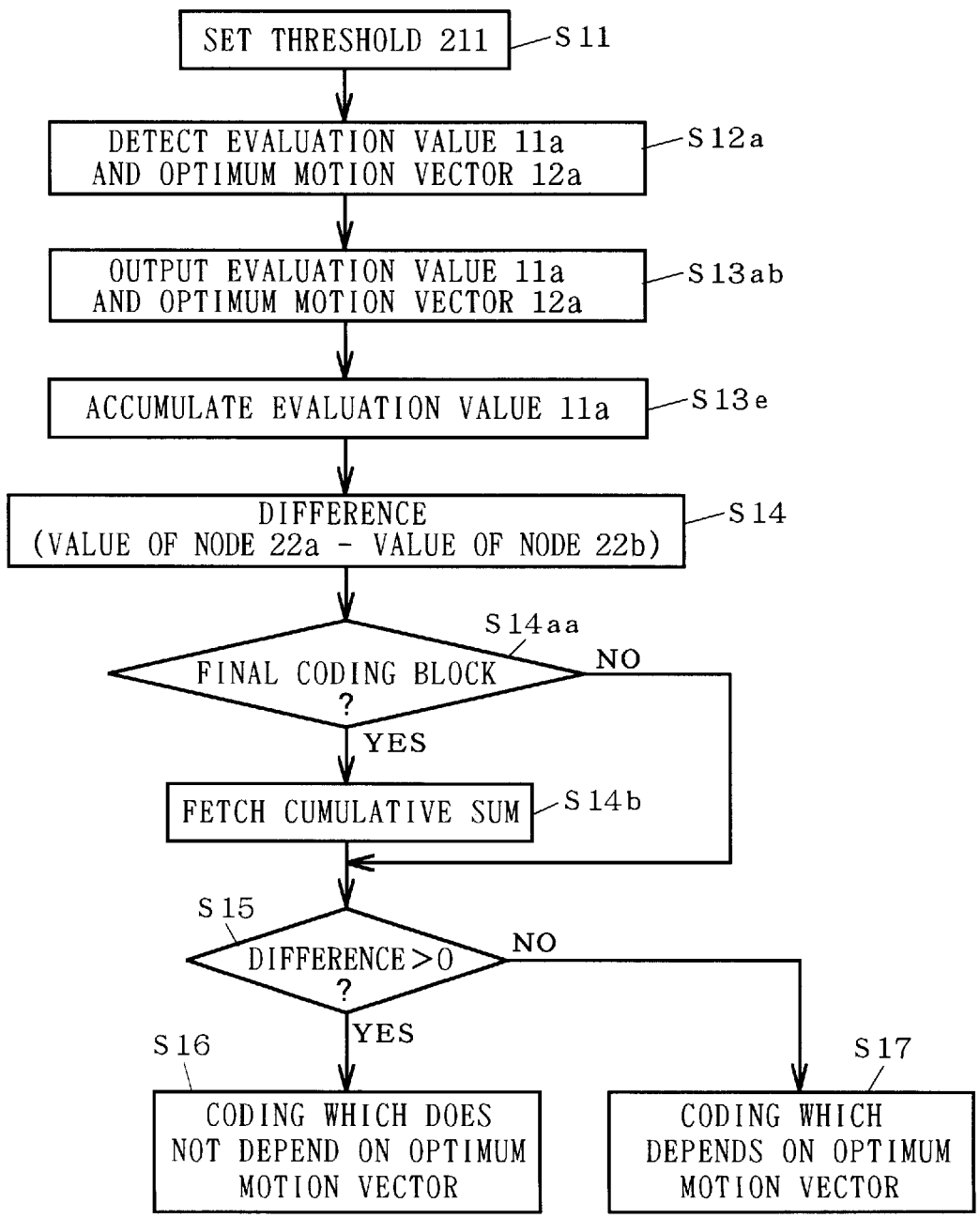
FIG. 20 is a flow chart showing an image coding method according to the eighth embodiment of the present invention.

FIG. 20 is a flow chart showing operation of the image coding apparatus according to the eighth embodiment.

First of all, Steps S11 and S12a are executed in the same manner as in the first embodiment.

The motion vector detecting device 1 outputs the evaluation value 11a and the optimum motion vector 12a. At this time, the motion vector delay device 29 outputs the optimum motion vector 12a of an image plane which is earlier by one image plane period, that is, a last coding object image plane 920. One image plane period means a time necessary for coding all coding blocks in the coding object image plane 920). More specifically, the motion vector delay device 29 delays, by one image plane period, the optimum motion vector 12a output from the motion vector detecting device 1 on receipt thereof, and outputs the same (Step S13ab).

Next, the accumulator 27 sums values of the nodes 27a and 27b to generate and output a cumulative sum of the node 27a (Step S13e).

Then, Steps S14, S15, S16 and S17 are executed in the same manner as in the first embodiment.

Thus, the motion vector detecting device 1, the information selecting device 2 and a real time image coding device 3 also perform coding for other coding blocks in the coding object image plane 920, and further perform the coding for a subsequent coding object image plane 920. In this case, if a coding block 921 processed at Step S12a has been detected as a final coding block of the coding object image plane 920 (Step S14aa), Step S14b is executed. More specifically, the cumulative sum storing section 28 fetches and outputs a cumulative sum output from the accumulator 27 after Step S14 is executed. Then, the accumulator 27 sets the cumulative sum to zero. Accordingly, the cumulative sum fetched by the cumulative sum storing section 28 is a sum of evaluation values detected for all the coding blocks in the coding object image plane 920).

Step S11 is executed when a threshold 211 should be reset.

Thus, the cumulative sum storing section 28 outputs the sum of the evaluation values detected for all the coding blocks in the last coding object image plane 920. The motion vector delay device 29 outputs the optimum motion vector 12a of the last coding object image plane 920. The comparator 22 compares the threshold 211 with the cumulative sum to detect, as a difference 221, a correlation between the coding object image plane 920 and a reference image plane 910. If the difference 221 is greater than zero (or equal to or greater than zero), the correlation between the coding object image plane 920, and the reference image plane 910 is low. If not so, the correlation is high.

According to the present embodiment, the following effects can be obtained in addition to the effects of the first embodiment.

The information selecting device 2 detects the correlation between the coding object image plane 920 and the reference image plane 910 on the basis of the cumulative sum. When it is detected that the correlation is low, predictive coding is performed by using a motion vector 231 so that a coding quantity of header information can be reduced. Accordingly, a coding quantity of the coding block can be increased corresponding to a reduction in the coding quantity of the header information. Consequently, a quality of the coding object image plane 920 can be enhanced.

When it is detected that the correlation is low, the motion vector 231 is continuously output as a motion vector 241 while all the coding blocks in the coding object image plane 920 are being coded. As described in the third embodiment, the real time image coding device 3 generates a difference between the motion vector 241 and the motion vector 241 of the coding block which was coded last time, and performs variable-length coding by using the difference. Accordingly, even if the motion vector 231 has a displacement other than (0, 0), the difference generated by the real time image coding device 3 has the displacement (0, 0). Consequently, the coding quantity of the header information can be reduced. As a result, the coding quantity of the coding block can be increased corresponding to a reduction in the coding quantity of the header information. Thus, the quality of the coding object image plane 920 can be enhanced.

Ninth Embodiment

Figure 21:
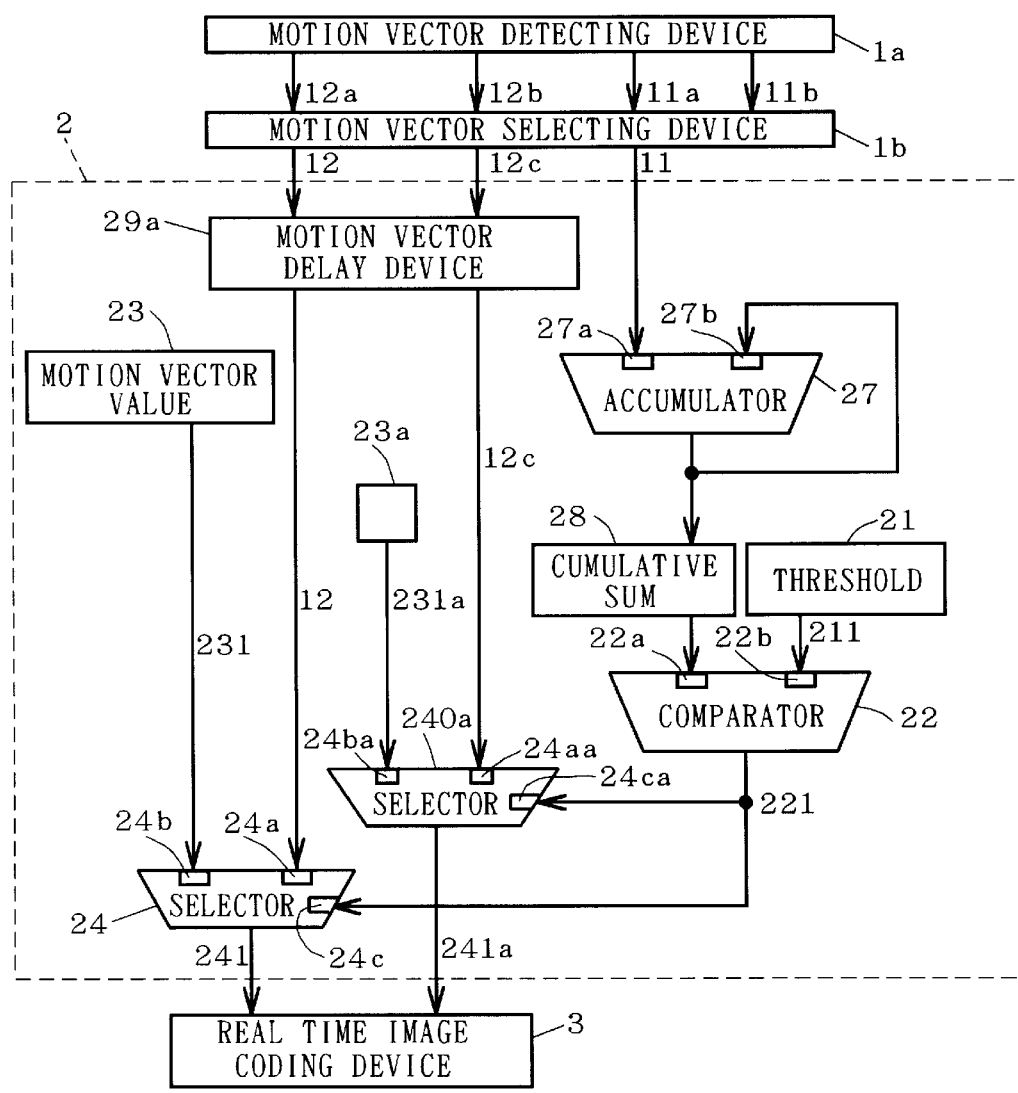
FIG. 21 is a block diagram showing a main part of an image coding apparatus according to a ninth embodiment of the present invention.

FIG. 21 is a block diagram showing an image coding apparatus according to a ninth embodiment of the present invention.

First of all, a structure of the image coding apparatus shown in FIG. 21 is obtained by a combination of FIGS. 5 and 19.

An internal structure of an information selecting device 2 according to the present embodiment is as follows. An accumulator 27 receives, at nodes 27a and 27b, an evaluation value 11 output from a motion vector selecting device 1b and an output of the accumulator 27, respectively. A cumulative sum storing section 28 receives the output of the accumulator 27. A comparator 22 receives an output of the cumulative sum storing section 28 at a node 22a. A motion vector delay device 29a receives an optimum motion vector 12 and a mode value 12c which are output from the motion vector selecting device 1b. A selector 24 receives, at a node 24a, the optimum motion vector 12 output from the motion vector delay device 29a. A selector 240a receives, at a node 24aa, the mode value 12c output from the motion vector delay device 29a.

Other structures are the same as in FIGS. 5 and 19.

Figure 22:
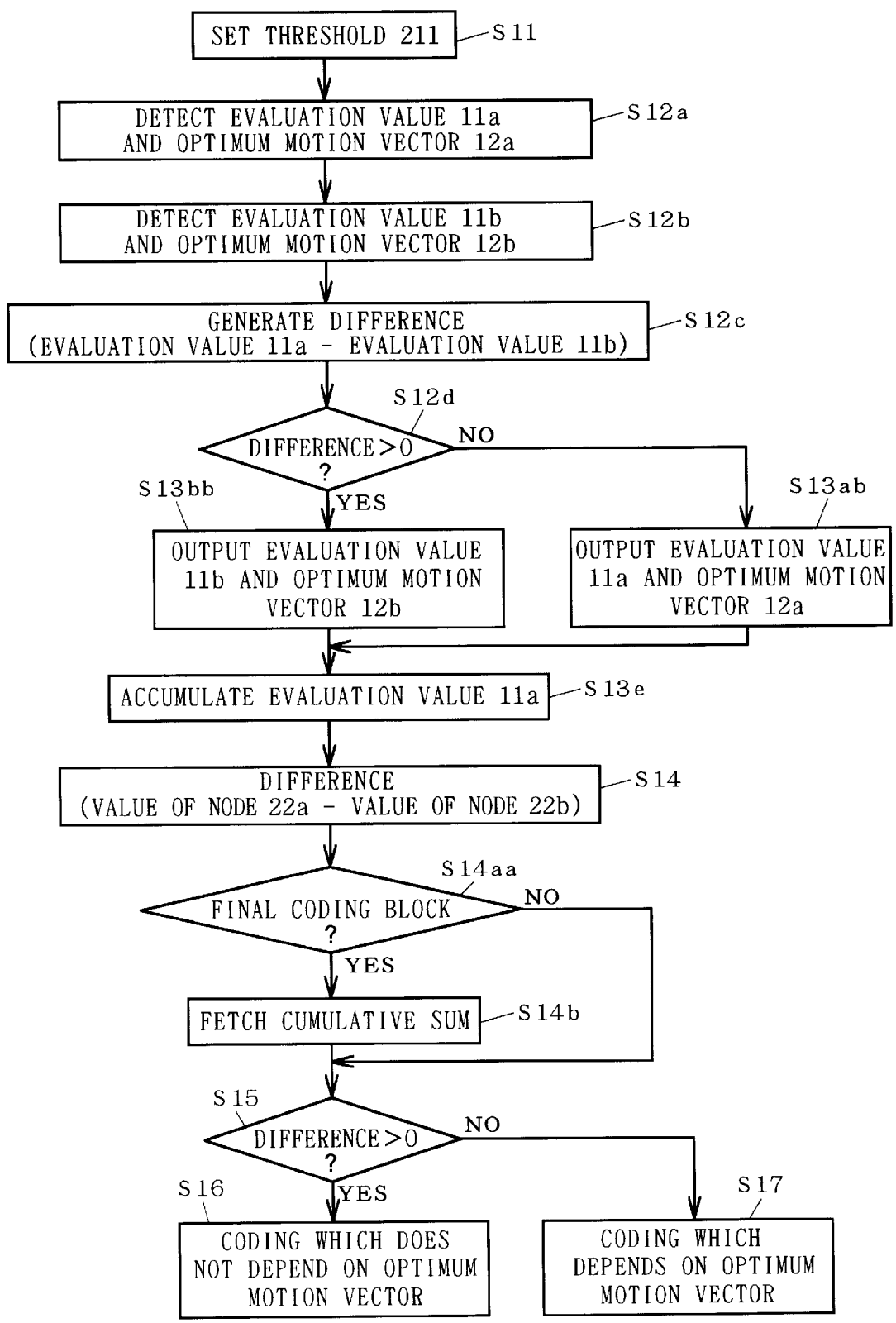
FIG. 22 is a flow chart showing an image coding method according to the ninth embodiment of the present invention.

FIG. 22 is a flow chart showing operation of the image coding apparatus according to the ninth embodiment.

First of all, Steps S11 to S12d are executed in the same manner as in the second embodiment.

If a difference is greater than zero (or equal to or greater than zero), the motion vector selecting device 1b selects an evaluation value 11b and an optimum motion vector 12b and outputs them as an evaluation value 11 and an optimum motion vector 12, respectively. If not so, the motion vector selecting device 1b selects an evaluation value 11a and an optimum motion vector 12a and outputs them as the evaluation value 11 and the optimum motion vector 12, respectively. In this case, the motion vector selecting device 1b outputs the mode value 12c indicative of the fact that the optimum motion vector 12 is one optimum motion vector 12a or a set of optimum motion vectors 12b. At this time, the motion vector delay device 29a outputs the mode value 12c and the optimum motion vector 12 of an image plane which is earlier by one image plane period, that is, a last coding object image plane 920. More specifically, the motion vector delay device 29a delays, by one image plane period, the optimum motion vector 12 and the mode value 12c which are output from the motion vector selecting device 1b on receipt thereof, and outputs them (Steps S13ab and S13bb).

Next, Step S13e is executed in the same manner as in the eighth embodiment.

Then, Steps S14, S15, S16 and S17 are executed in the same manner as in the second embodiment.

Thus, a motion vector detecting device 1a, the motion vector selecting device 1b, the information selecting device 2 and a real time image coding device 3 also perform coding for other coding blocks in a coding object image plane 920, and further perform the coding for a subsequent coding object image plane 920. In this case, if a coding block 921 processed at Step S12a has been detected as a final coding block of the coding object image plane 920 (Step S14aa), Step S14b is executed in the same manner as in the eighth embodiment.

Step S11 is executed when a threshold 211 should be reset.

According to the present embodiment, the same effects as in the second and eighth embodiments can be obtained.

Tenth Embodiment

Figure 23:
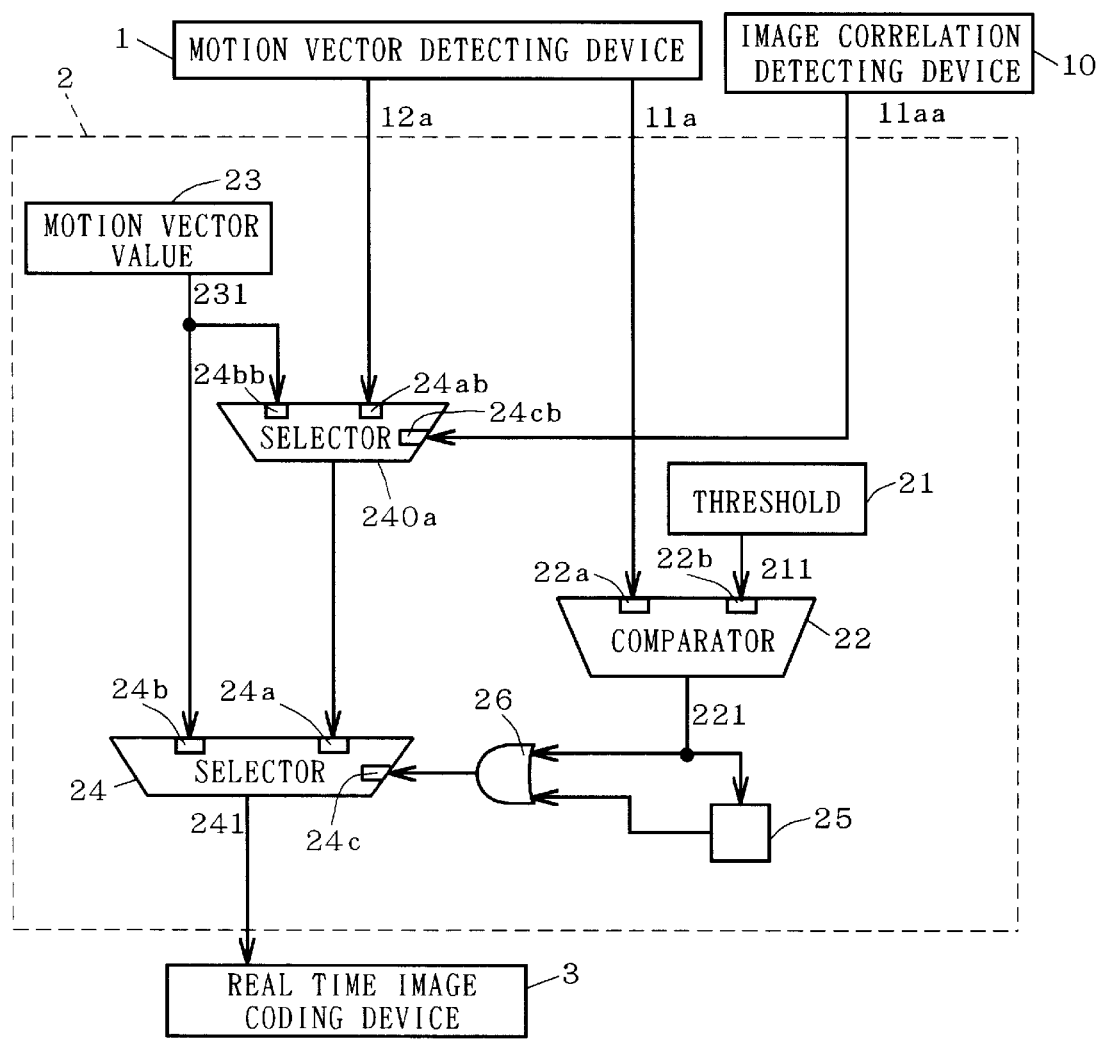
FIG. 23 is a block diagram showing a main part of an image coding apparatus according to a tenth embodiment of the present invention.

FIG. 23 is a block diagram showing an image coding apparatus according to a tenth embodiment of the present invention.

An internal structure of an information selecting device 2 according to the present embodiment is as follows. A selector 240a receives, at nodes 24ab, 24bb and 24cb, an optimum motion vector 12a output from a motion vector detecting device 1, a motion vector 231 output from a motion vector storing section 23 and a correlation value 11aa output from an image correlation detecting device 10, respectively. A selector 24 receives an output of the selector 240a at a node 24a.

Other structures are the same as in FIGS. 10 and 14.

Figure 24:
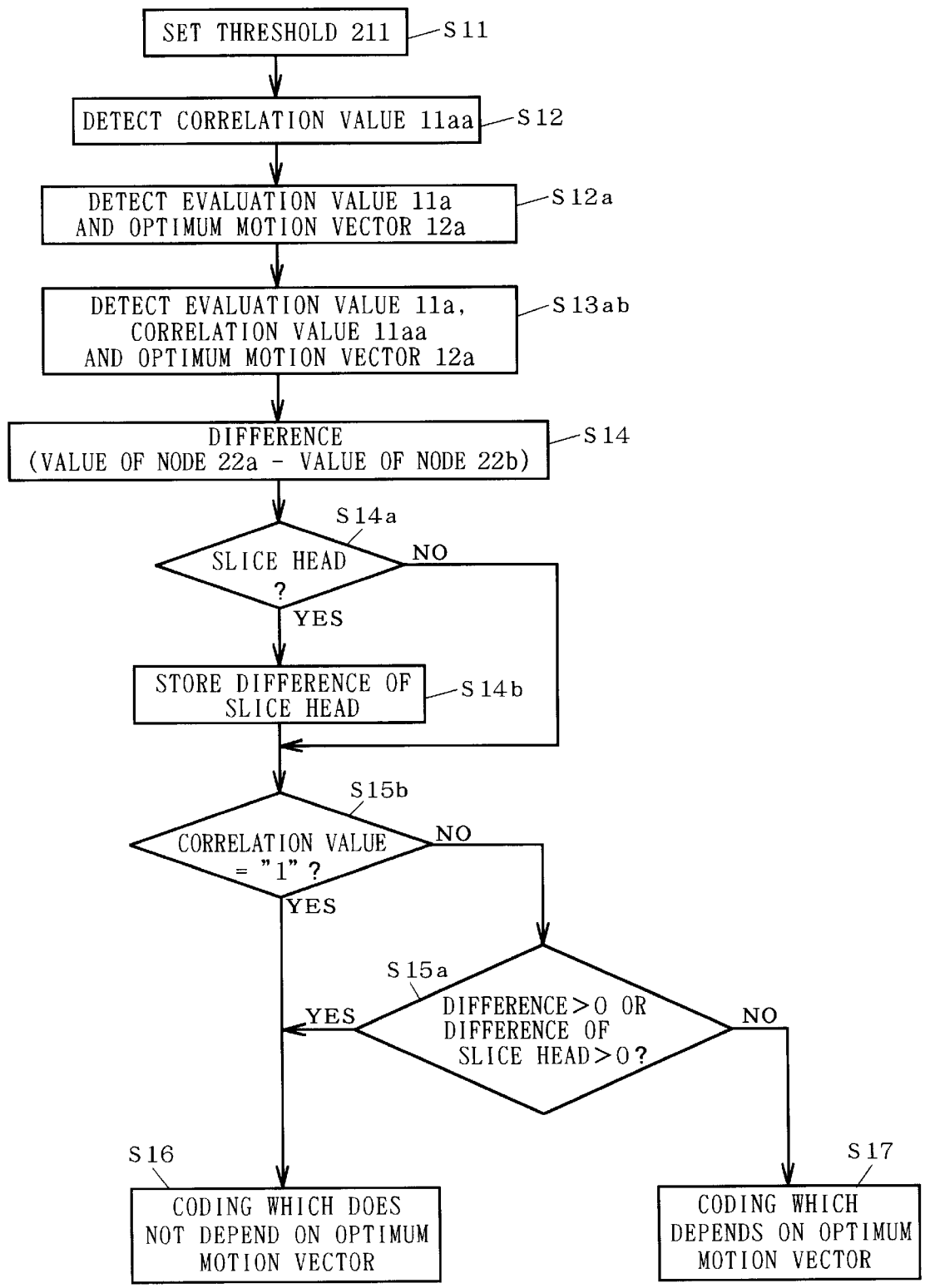
FIG. 24 is a flow chart showing an image coding method according to the tenth embodiment of the present invention.

FIG. 24 is a flow chart showing operation of the image coding apparatus according to the tenth embodiment.

First of all, Step S11 is executed in the same manner as in the fourth embodiment.

Then, Step S12 is executed in the same manner as in the sixth embodiment.

Thereafter, Step S12a is executed in the same manner as in the fourth embodiment.

The motion vector detecting device 1 outputs an evaluation value 11a and the optimum motion vector 12a, and the image correlation detecting device 10 outputs the correlation value 11aa (Step S13ab).

Next, Steps S14 to S14b are executed in the same manner as in the fourth embodiment.

The selector 240a decides whether a value of the node 24cb is "1" or not. If the value of the node 24cb is "1", the selector 240a selects and outputs a value of the node 24bb. If not so, the selector 240a selects and outputs a value of the node 24ab (Step S15b).

Then, Steps S15a to S17 are executed in the same manner as in the fourth embodiment.

Thus, one of the motion vector 231 and the optimum motion vector 12a is selected as a motion vector 241 according to a correlation detected by an OR circuit 26 and that detected by the image correlation detecting device 10. Consequently, a coding block 921 is coded by using the motion vector 241.

Selecting means including the selectors 24 and 240a performs selection by giving the correlation priority over an output of the OR circuit 26 (a result of comparison).

According to the present embodiment, the following effect can be obtained in addition to the effects of the fourth and sixth embodiments.

By giving priority to the correlation detected by the image correlation detecting device 10 to perform the selection, a redundancy between a reference image plane 910 and a coding object image plane 920 can be judged with high precision.

Variant

Even if the first to tenth embodiments are applied to other coding methods using the same specification as that of MPEG2 or the like, the same effects can be obtained. The second, fifth, seventh and ninth embodiments can be applied to neither H.261 nor MPEG1. The fourth and tenth embodiments cannot be applied to the H.261.

The motion vector detecting devices 1 and 1a may have internal structures other than those in FIGS. 4 and 7. The image correlation detecting device 10 may have an internal structure other than that in FIG. 15. The whole image coding apparatus can have an internal structure other than that in FIG. 2.

While the invention has been described in detail, the foregoing description is in all aspects illustrative and not restrictive. It is understood that numerous other modifications and variations can be devised without departing from the scope of the invention.

We claim:

1. An image coding method for performing predictive coding for a first image in a coding object image plane by using motion information about a motion of said first image from a certain position in a reference image plane, comprising:

a first step of detecting first displacement information including a first displacement quantity from a second image in said reference image plane corresponding to said first image in said coding object image plane to said first image;

a second step of selecting either said first displacement information or predetermined second displacement information; and a third step of performing said predictive coding by using, as said motion information, said first or second displacement information selected at said second step, wherein said second displacement information includes a predetermined second displacement quantity, and said first step includes a fourth step of detecting an evaluation value indicative of a degree of similarity of each image in said reference image plane to said first image, and said second step includes a fifth step of comparing said evaluation value with a predetermined threshold, and a sixth step of performing said selection in response to a result of said comparison.

2. The image coding method according to claim 1, wherein said coding object image plane has a plurality of blocks, said blocks having said first image, respectively, said image coding method further comprising a seventh step of repeatedly executing said first and second steps for said blocks, and said selection of said sixth step is performed in response to the result of said comparison corresponding to the evaluation value for one of said blocks which is positioned on a periphery in said coding object image plane.

3. The image coding method according to claim 2, further comprising an eighth step of detecting a correlation between said reference image plane and said coding object image plane, wherein said sixth step performs said selection by giving said correlation priority over said result of said comparison.

4. An image coding method for performing predictive coding for a first image in a coding object image plane by using motion information about a motion of said first image from a certain position in a reference image plane, comprising:

a first step of detecting first displacement information including a first displacement quantity from a second image in said reference image plane corresponding to said first image in said coding object image plane to said first image;

a second step of selecting either said first displacement information or predetermined second displacement information; and a third step of performing said predictive coding by using, as said motion information said first or second displacement information selected at said second step, wherein said first displacement information includes one or more first displacement quantities, and first mode information indicative of the number of said first displacement quantities, and said second displacement information includes a predetermined second displacement quantity, and second mode information indicative of the number of said second displacement quantity.

5. An image coding method for performing predictive coding for a first image in a coding object image plane by using motion information about a motion of said first image from a certain position in a reference image plane, comprising:

a first step of detecting first displacement information including a first displacement quantity from a second image in said reference image plane corresponding to said first image in said coding object image plane to said first image;

a second step of selecting either said first displacement information or predetermined second displacement information;

a third step of performing said predictive coding by using, as said motion information said first or second displacement information selected at said second step; and a fourth step of detecting a correlation between said reference image plane and said coding object image plane, wherein said second step performs said selection in response to said correlation.

6. An image coding method for performing predictive coding for a first image in a coding object image plane by using motion information about a motion of said first image from a certain position in a reference image plane, comprising:

a first step of detecting first displacement information including a first displacement quantity from a second image in said reference image plane corresponding to said first image in said coding object image plane to said first image;

a second step of selecting either said first displacement information or predetermined second displacement information; and a third step of performing said predictive coding by using, as said motion information said first or second displacement information selected at said second step, wherein said coding object image plane has a plurality of blocks, said blocks having said first image, respectively, said image coding method further comprises a fourth step of repeatedly executing said first and second steps for said blocks, said second displacement information is said first displacement information detected at said first step executed last time, and said third step generates a difference between last motion information and current motion information and performs said coding by using said difference.

7. An image coding apparatus for performing predictive coding for a first image in a coding object image plane by using motion information about a motion of said first image from a certain position in a reference image plane, comprising:

motion information detecting means for detecting first displacement information including a first displacement quantity from a second image in said reference image plane corresponding to said first image in said coding object image plane to said first image;

displacement information storing means for storing predetermined second displacement information;

selecting means for selecting either said first displacement information or said second displacement information;

predictive coding means for performing said predictive coding by using, as said motion information, said first or second displacement information selected by said selecting means;

a threshold storing means for storing a predetermined threshold; and comparing means for comparing an evaluation value output from said motion information detecting means with said threshold, wherein said second displacement information includes a predetermined second displacement quantity, said motion information detecting means detects the evaluation value indicative of a degree of similarity of each image in said reference image plane to said first image, and said selecting means performs said selection in response to a result of said comparison.

8. The image coding apparatus according to claim 7, wherein said coding object image plane has a plurality of blocks, said blocks have said first image, respectively, said motion information detecting means and said selecting means perform said detection and said selection for said blocks, respectively, and said image coding apparatus further comprises specific result storing means for storing said result of said comparison corresponding to a specific one of said blocks which is positioned on a periphery in said coding object image plane, and outputting said result of said comparison stored in said specific result storing means to said selecting means.

9. The image decoding apparatus according to claim 8, further comprising image plane correlation detecting means for detecting a correlation between said reference image plane and said coding object image plane, wherein said selecting means performs said selection by giving said correlation priority over said result of said comparison.

10. An image coding apparatus for performing predictive coding for a first image in a coding object image plane by using motion information about a motion of said first image from a certain position in a reference image plane, comprising:

motion information detecting means for detecting first displacement information including a first displacement quantity from a second image in said reference image plane corresponding to said first image in said coding object image plane to said first image;

displacement information storing means for storing predetermined second displacement information;

selecting means for selecting either said first displacement information or said second displacement information;

predictive coding means for performing said predictive coding by using, as said motion information, said first or second displacement information selected by said selecting means, wherein said first displacement information includes one or more first displacement quantities, and first mode information indicative of the number of said first displacement quantities, and said second displacement information includes a predetermined second displacement quantity, and second mode information indicative of the number of said second displacement quantity.

11. An image coding apparatus for performing predictive coding for a first image in a coding object image plane by using motion information about a motion of said first image from a certain position in a reference image plane, comprising:

motion information detecting means for detecting first displacement information including a first displacement quantity from a second image in said reference image plane corresponding to said first image in said coding object image plane to said first image;

displacement information storing means for storing predetermined second displacement information;

selecting means for selecting either said first displacement information or said second displacement information;

predictive coding means for performing said predictive coding by using, as said motion information, said first or second displacement information selected by said selecting means;

image plane correlation detecting means for detecting a correlation between said reference image plane and said coding object image plane, wherein said selecting means performs said selection in response to said correlation.

12. An image coding apparatus for performing predictive coding for a first image in a coding object image plane by using motion information about a motion of said first image from a certain position in a reference image plane, comprising:

motion information detecting means for detecting first displacement information including a first displacement quantity from a second image in said reference image plane corresponding to said first image in said coding object image plane to said first image;

displacement information storing means for storing predetermined second displacement information;

selecting means for selecting either said first displacement information or said second displacement information;

predictive coding means for performing said predictive coding by using, as said motion information, said first or second displacement information selected by said selecting means, wherein said coding object image plane has a plurality of blocks, said blocks have said first image, respectively, said motion information detecting means and said selecting means perform said detection and said selection for said blocks, respectively, said second displacement information stored in said displacement information storing means is said first displacement information detected by said motion information detecting means last time, and said predictive coding means generates a difference between last motion information and current motion information, and performs said coding by using said difference.

13. An image coding method for performing predictive coding for a first image in a coding object image plane by using motion information about a motion of said first image from a certain position in a reference image plane, comprising:

a first step of detecting first displacement information including a first displacement quantity from a second image in said reference image plane corresponding to said first image in said coding object image plane to said first image;

a second step of selecting either said first displacement information or predetermined second displacement information; and a third step of performing said predictive coding by using, as said motion information said first or second displacement information selected at said second step, wherein said first step includes a fourth step of detecting an evaluation value indicative of a degree of similarity of each image in said reference image plane to said first image, said coding object image plane has a plurality of blocks, said blocks having first image, respectively, said first step being repeated for said plurality of blocks, said image coding method further comprises a fifth step of generating a sum of the evaluation values for said plurality of blocks, and said second step includes a sixth step of comparing the sum with a predetermined threshold, the selection being performed in response to a result of the comparison, said second step being repeated for said plurality of blocks.

14. An image coding apparatus for performing predictive coding for a first image in a coding object image plane by using motion information about a motion of said first image from a certain position in a reference image plane, comprising:

motion information detecting means for detecting first displacement information including a first displacement quantity from a second image in said reference image plane corresponding to said first image in said coding objet image plane to said first image;

displacement information storing means for storing predetermined second displacement information;

selecting means for selecting either said first displacement information or said second displacement information;

predictive coding means for performing said predictive coding by using, as said motion information, said first or second displacement information selected by said selecting means, wherein said coding object image plane has a plurality of blocks, said blocks having said first image, respectively, said motion information detecting means detects the first displacement information for each block and detects the evaluation values corresponding to said blocks, each evaluation value indicative of a degree of similarity of each image in said reference image plane to said first image, said image coding apparatus further comprising:

summing means for generating a sum of the evaluation values;

threshold storing means for storing a predetermined threshold; and comparing means for comparing the sum output from said summing means with the threshold stored in said threshold storing means, said selecting means performs said selection in response to a result of said comparison.

* * * * *